(12) United States Patent
Mosca et al.

(10) Patent No.: US 12,486,921 B2
(45) Date of Patent: Dec. 2, 2025

(54) VALVE COMPRISING A PIEZOELECTRIC ACTUATOR

(71) Applicant: PYTHEAS TECHNOLOGY, La Ciotat (FR)

(72) Inventors: Frédéric Mosca, La Ciotat (FR); Gilles Grosso, La Ciotat (FR); Simon Clement, La Ciotat (FR); Alice Aubry, La Ciotat (FR)

(73) Assignee: PYTHEAS TECHNOLOGY, La Ciotat (FR)

( * ) Notice: Subject to any disclaimer, the term of this patent is extended or adjusted under 35 U.S.C. 154(b) by 0 days.

(21) Appl. No.: 18/726,630

(22) PCT Filed: Jan. 5, 2023

(86) PCT No.: PCT/EP2023/050199
§ 371 (c)(1),
(2) Date: Jul. 3, 2024

(87) PCT Pub. No.: WO2023/131660
PCT Pub. Date: Jul. 13, 2023

(65) Prior Publication Data
US 2025/0075820 A1    Mar. 6, 2025

(30) Foreign Application Priority Data
Jan. 6, 2022 (FR) ...................................... 2200092

(51) Int. Cl.
*F16K 31/00* (2006.01)
*H10N 30/50* (2023.01)

(52) U.S. Cl.
CPC ............ *F16K 31/007* (2013.01); *H10N 30/50* (2023.02)

(58) Field of Classification Search
CPC .......... F16K 1/34; F16K 31/007; H02N 2/185
See application file for complete search history.

(56) References Cited

U.S. PATENT DOCUMENTS 3,166,684 A * 1/1965 Williams .............. B06B 1/0618
310/339
3,350,583 A 10/1967 Schiavone
(Continued)

FOREIGN PATENT DOCUMENTS

PL     70208 Y1    9/2018

OTHER PUBLICATIONS

International Search Report issued Apr. 21, 2023, in corresponding International Application No. PCT/EP2023/050199, 6 Pages.

*Primary Examiner* — Umashankar Venkatesan
(74) *Attorney, Agent, or Firm* — Maier & Maier, PLLC

(57) ABSTRACT

A valve including a pressurised fluid inlet and a fluid outlet, and including a fixed plate with first channels, a flap with second channels, the flap movable between: an opening position where the flap is spaced apart from the plate, the first channels and the second channels being in fluidic communication and allowing the flow of the fluid, a closing position where the flap is in contact with the plate, the first channels and the second channels not being in fluidic communication and blocking the flow of the fluid, a piezoelectric actuator acting upon the flap to move it between the closing position and opening position, the inlet is arranged in such a way that the pressurised fluid exerts a force on an active face of the flap stressing said flap to the closing position. The embodiments also relate to a system for generating electricity.

17 Claims, 15 Drawing Sheets

(56) References Cited

U.S. PATENT DOCUMENTS

| | | | | | |
|---|---|---|---|---|---|
| 4,284,263 | A | * | 8/1981 | Newcomb | F02M 61/167 |
| | | | | | 251/368 |
| 4,595,856 | A | * | 6/1986 | Glomb, Jr. | H02N 2/185 |
| | | | | | 310/323.01 |
| 5,092,360 | A | * | 3/1992 | Watanabe | C04B 37/026 |
| | | | | | 252/62.9 R |
| 5,281,885 | A | * | 1/1994 | Watanabe | F16K 31/007 |
| | | | | | 251/129.01 |
| 7,026,746 | B2 | * | 4/2006 | Audren | F16K 31/007 |
| | | | | | 310/323.17 |
| 8,967,200 | B2 | * | 3/2015 | Hayashi | F16K 1/34 |
| | | | | | 137/625.33 |
| 10,103,652 | B2 | * | 10/2018 | Jaffrey | E21B 33/061 |
| 11,537,150 | B2 | * | 12/2022 | Shakudo | F16K 31/007 |
| 11,927,281 | B1 | * | 3/2024 | Huff | F16K 99/0015 |
| 2011/0284779 | A1 | * | 11/2011 | Cewers | F16K 31/007 |
| | | | | | 251/118 |
| 2012/0273061 | A1 | * | 11/2012 | Hidaka | F16K 7/14 |
| | | | | | 251/129.01 |
| 2013/0048898 | A1 | | 2/2013 | Hayashi | |
| 2017/0211716 | A1 | | 7/2017 | Chase et al. | |

* cited by examiner

[Fig. 1a]
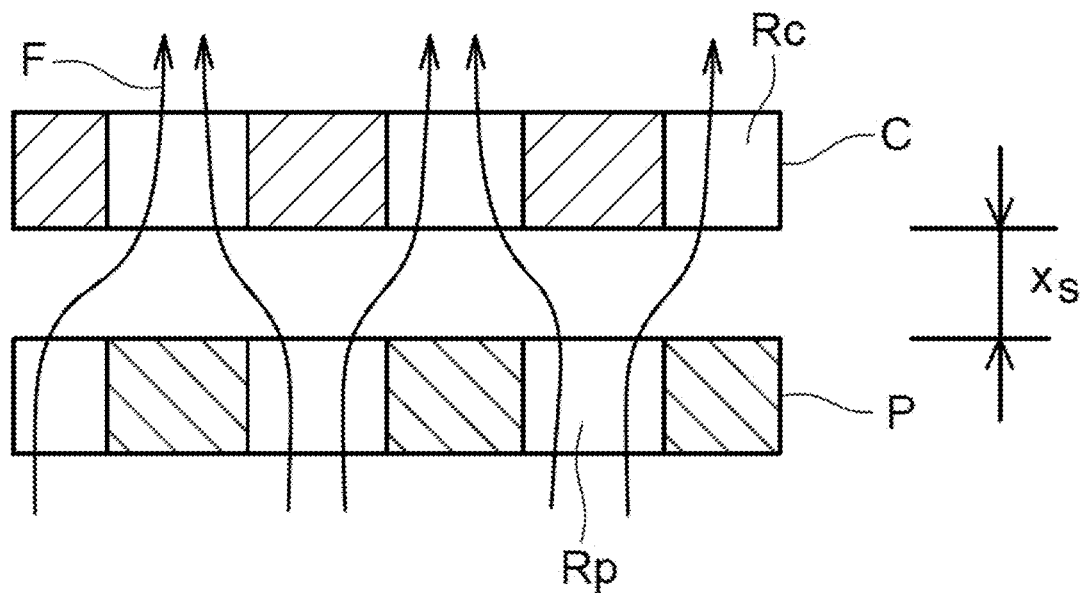
[Fig. 1b]
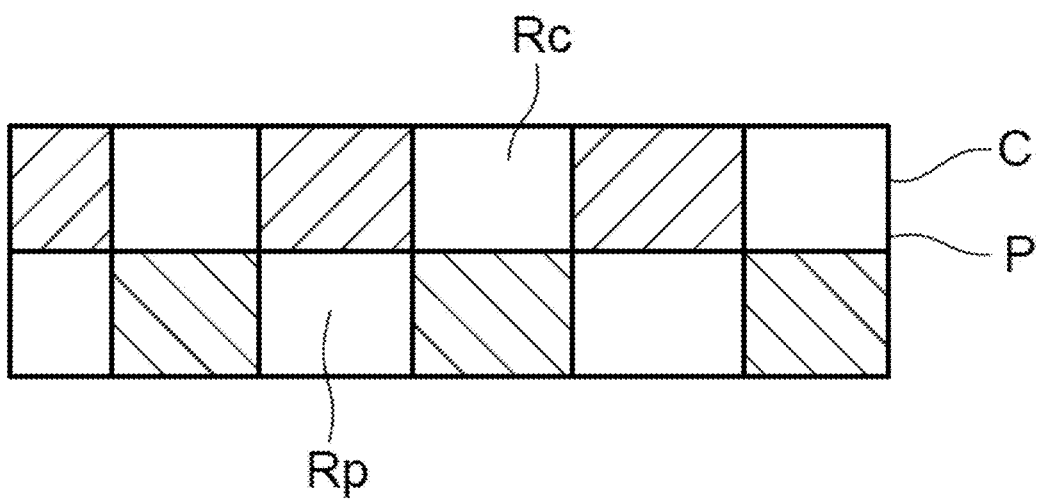

[Fig. 2a]
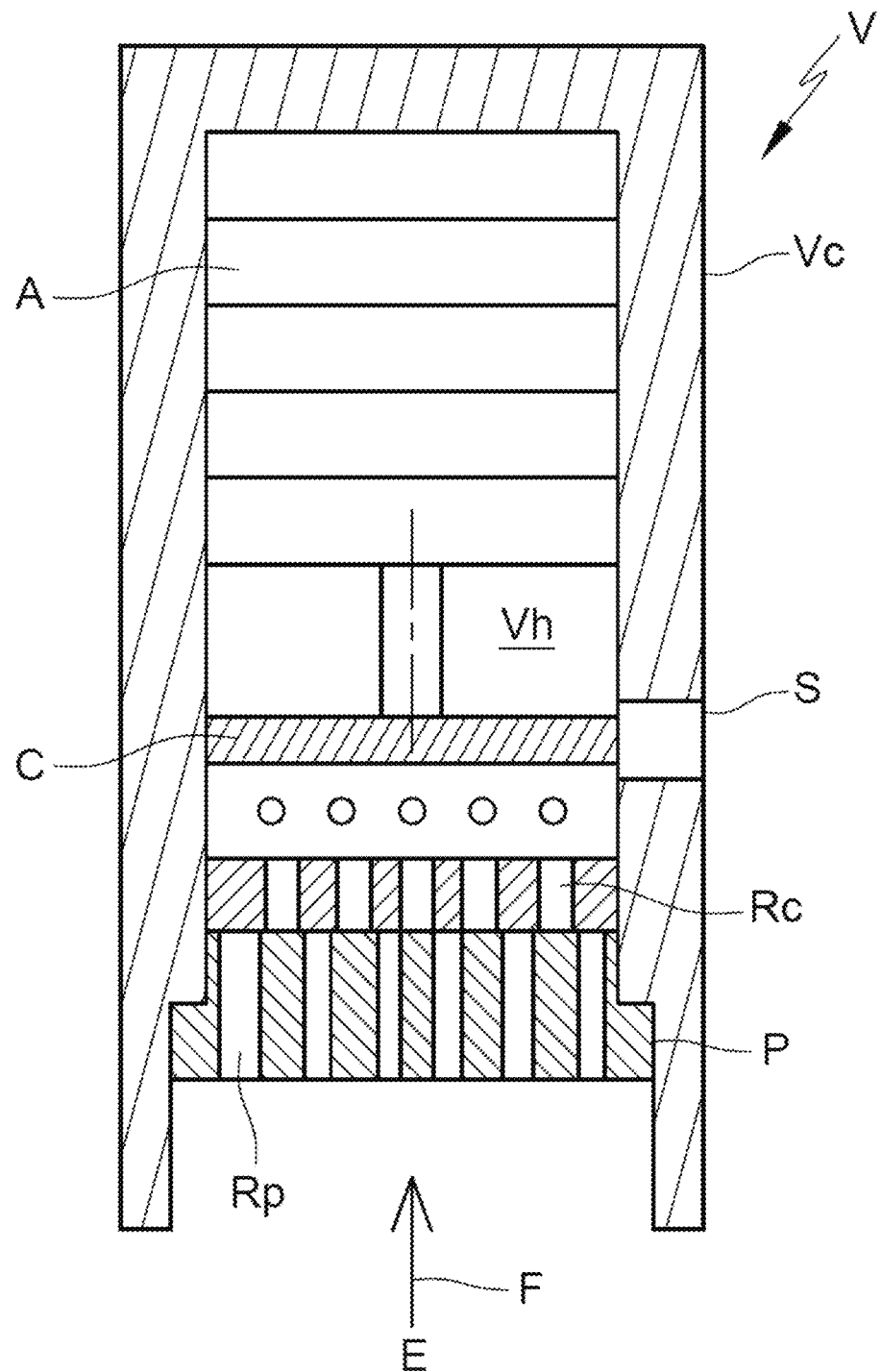

[Fig. 2b]
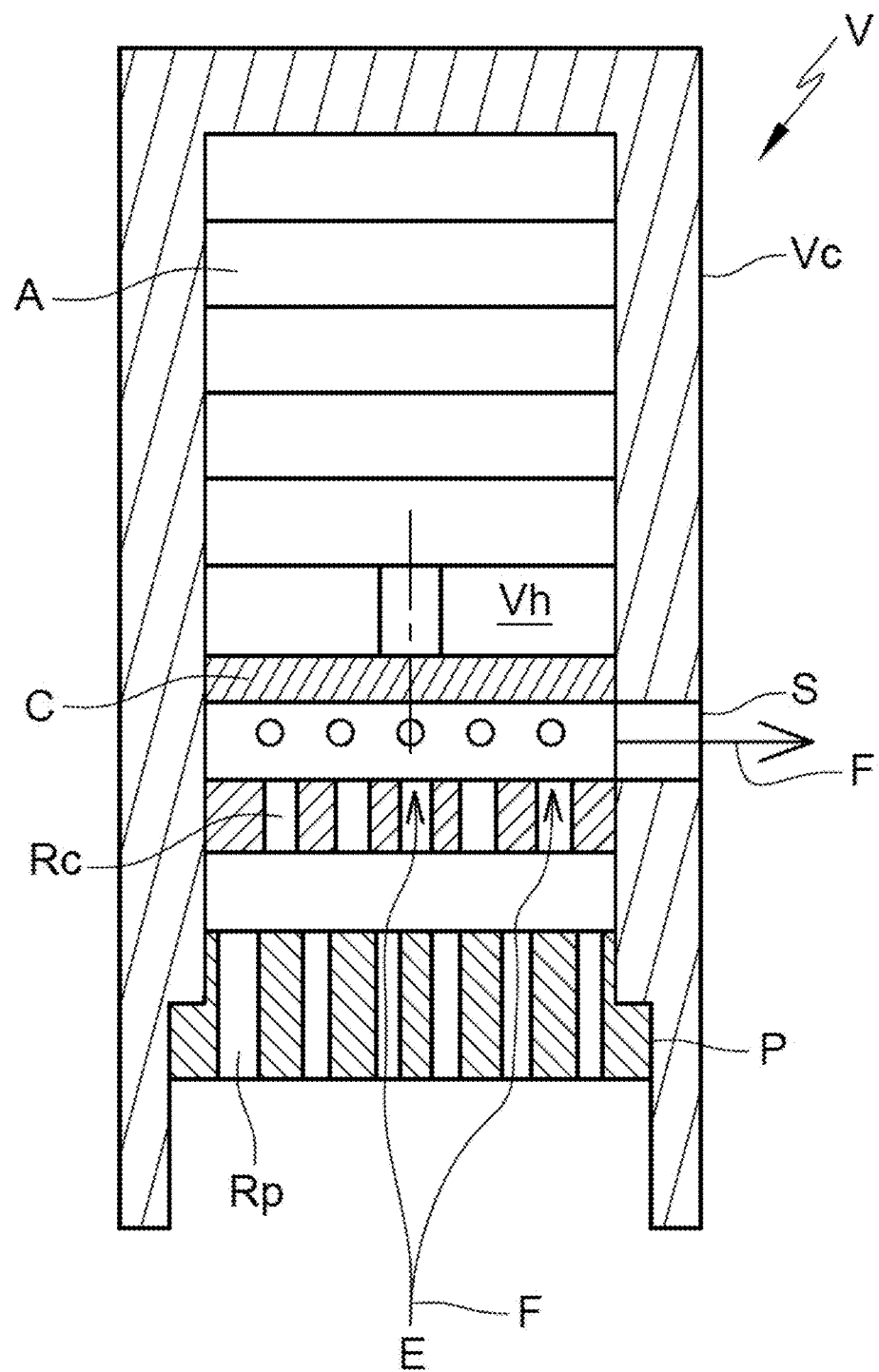

[Fig. 3]
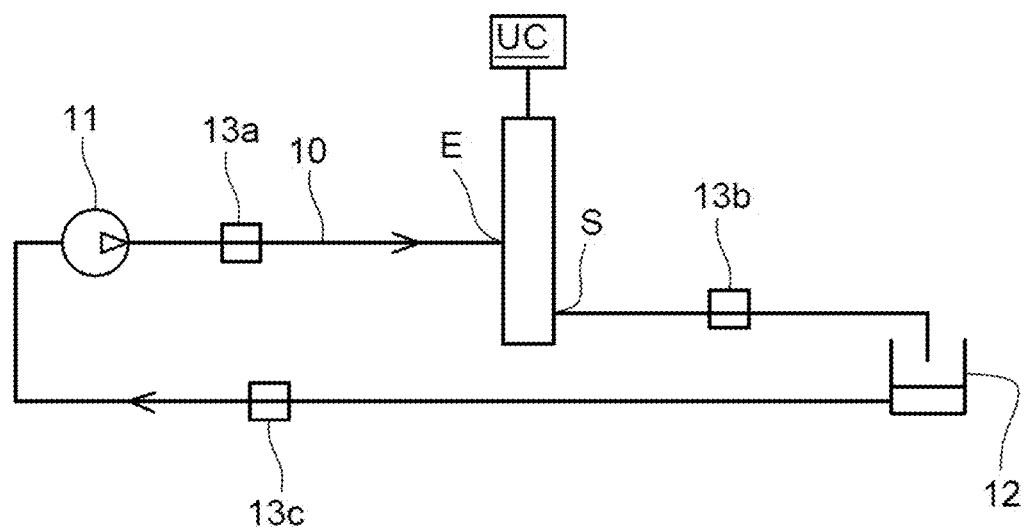

[Fig. 4a]
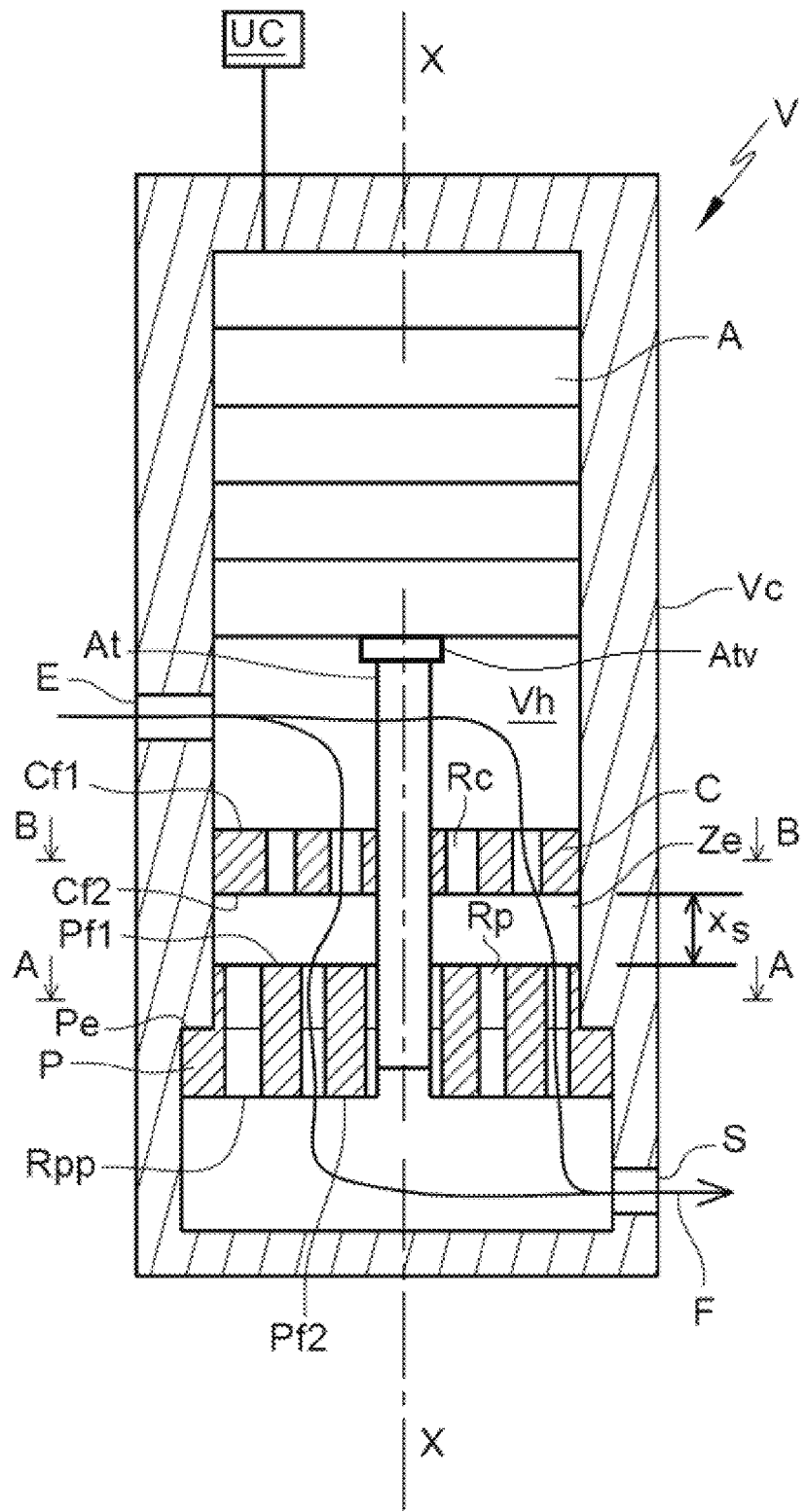

[Fig. 4b]
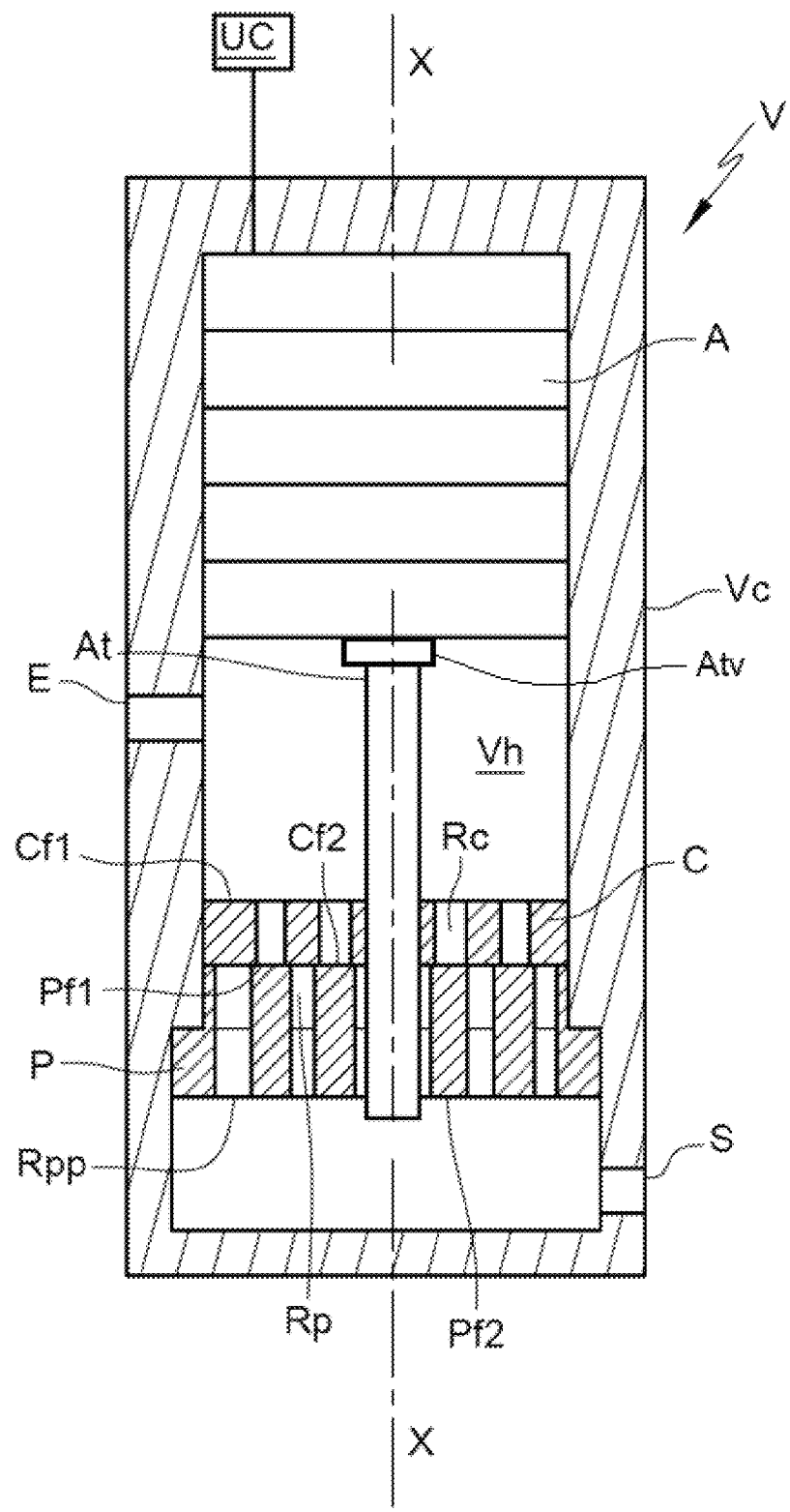

[Fig. 5a]
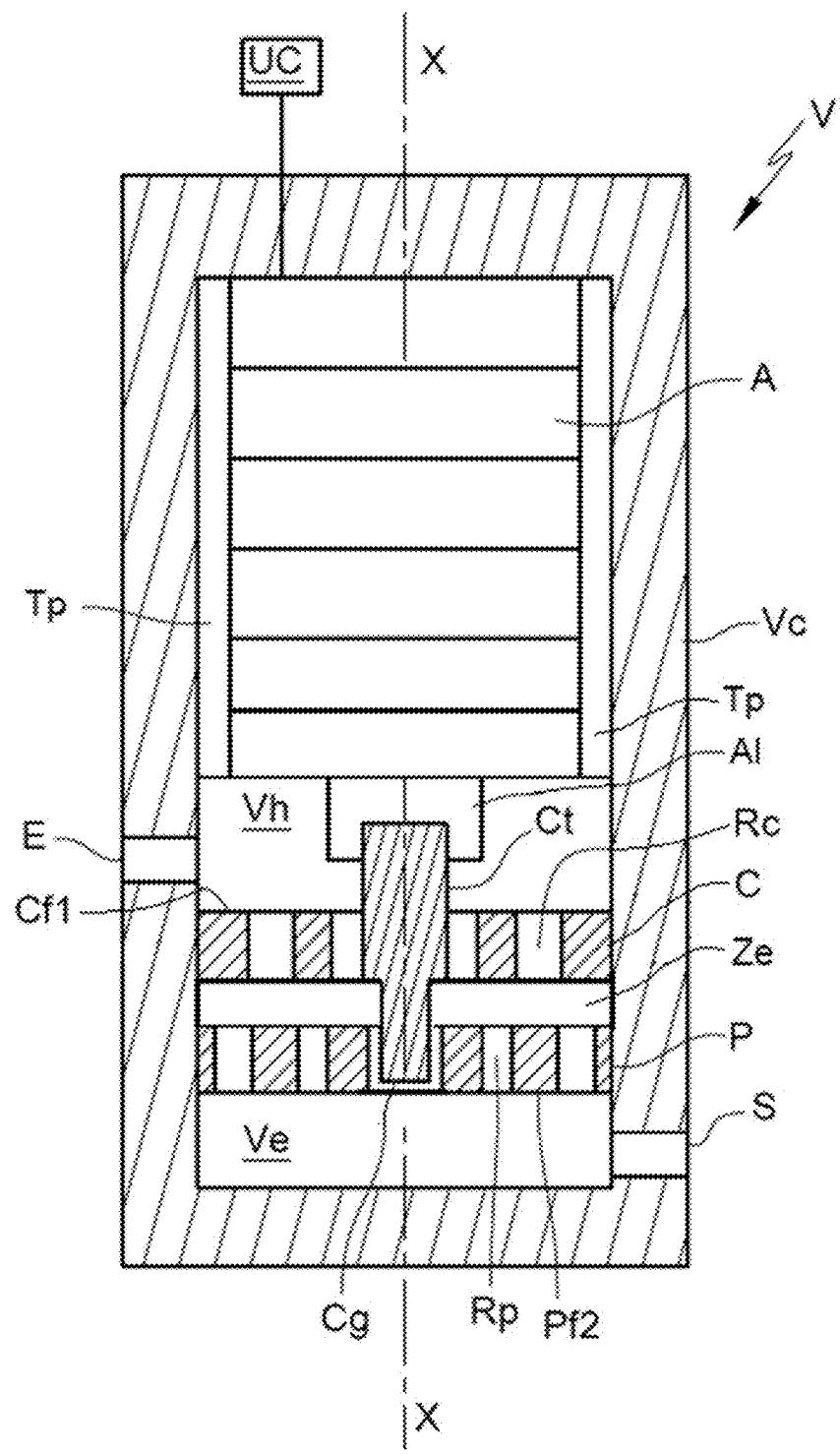

[Fig. 5b]
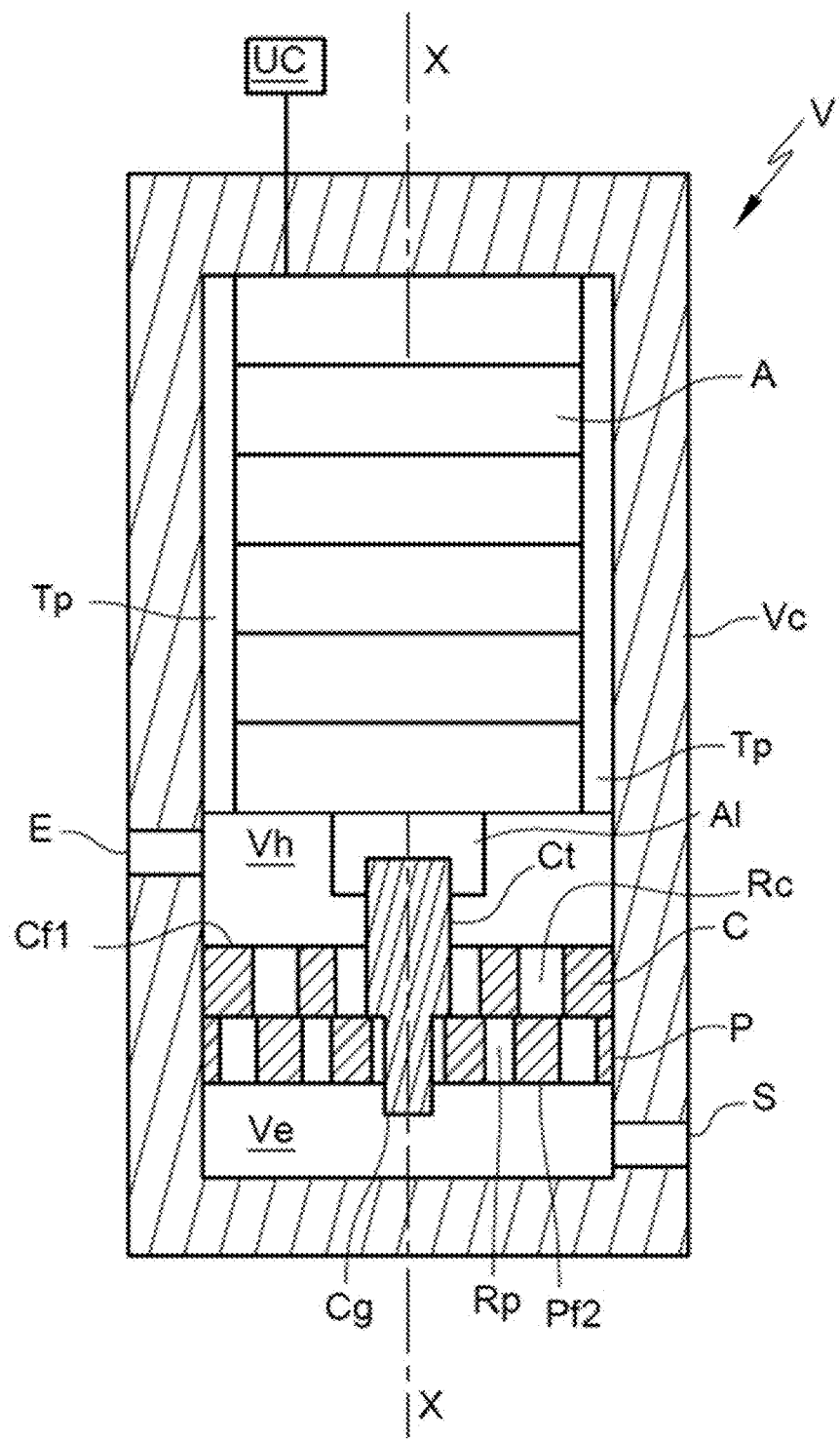

[Fig. 6a]
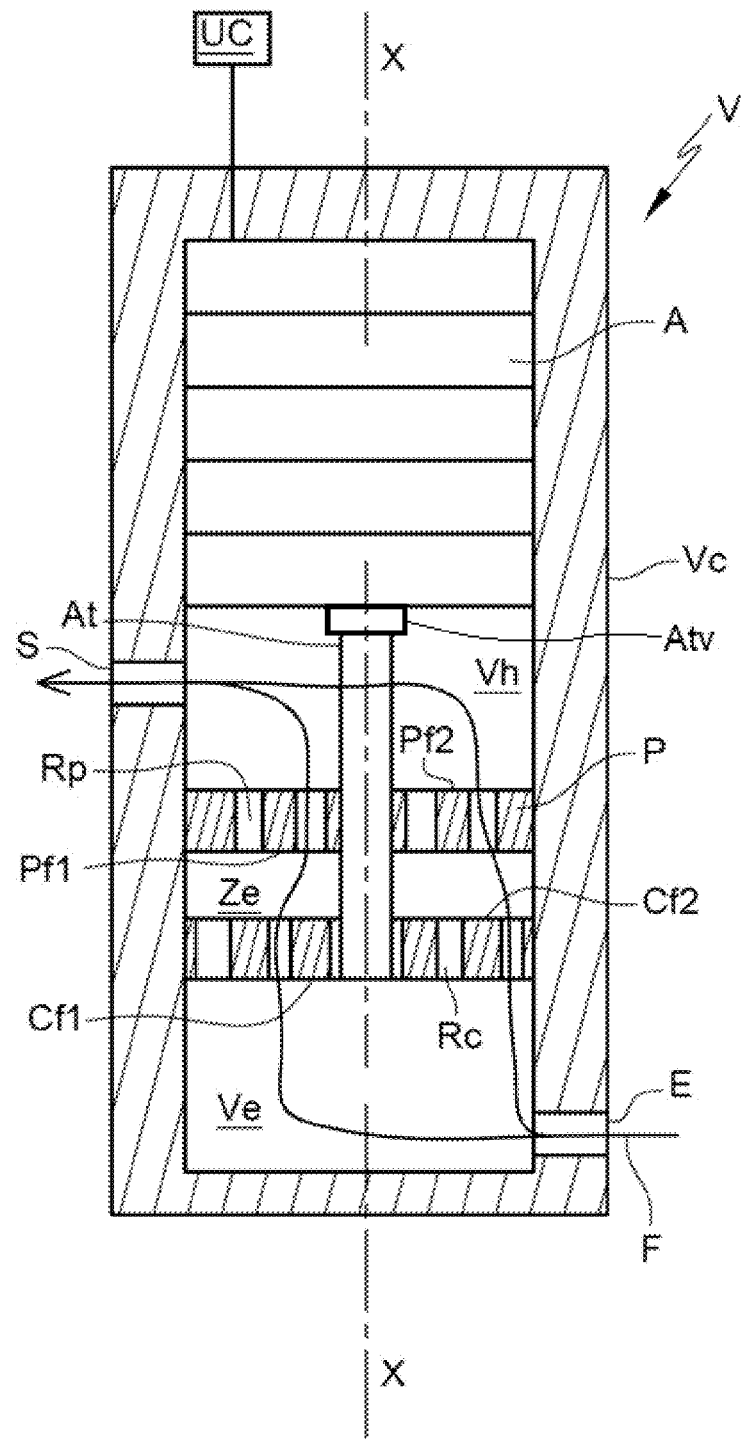

[Fig. 6b]
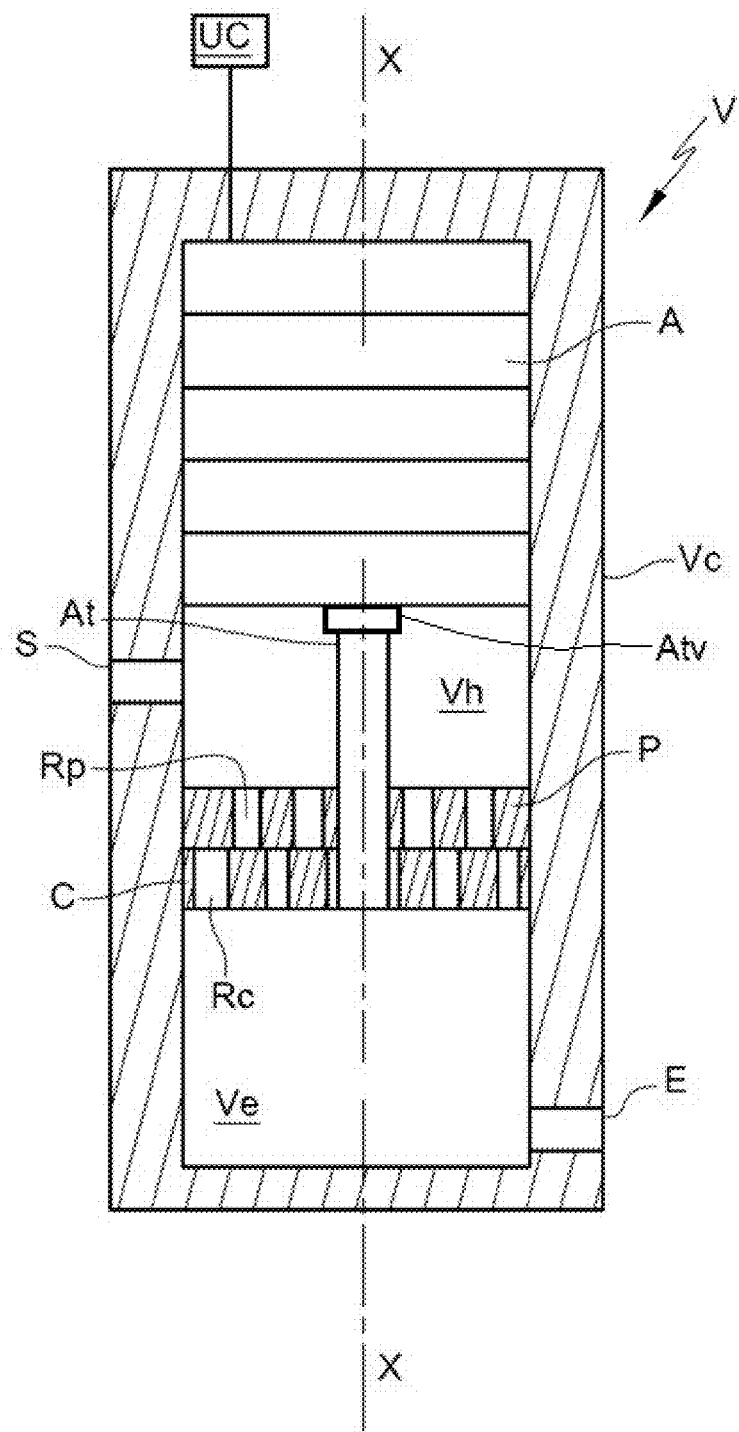

[Fig. 7a]
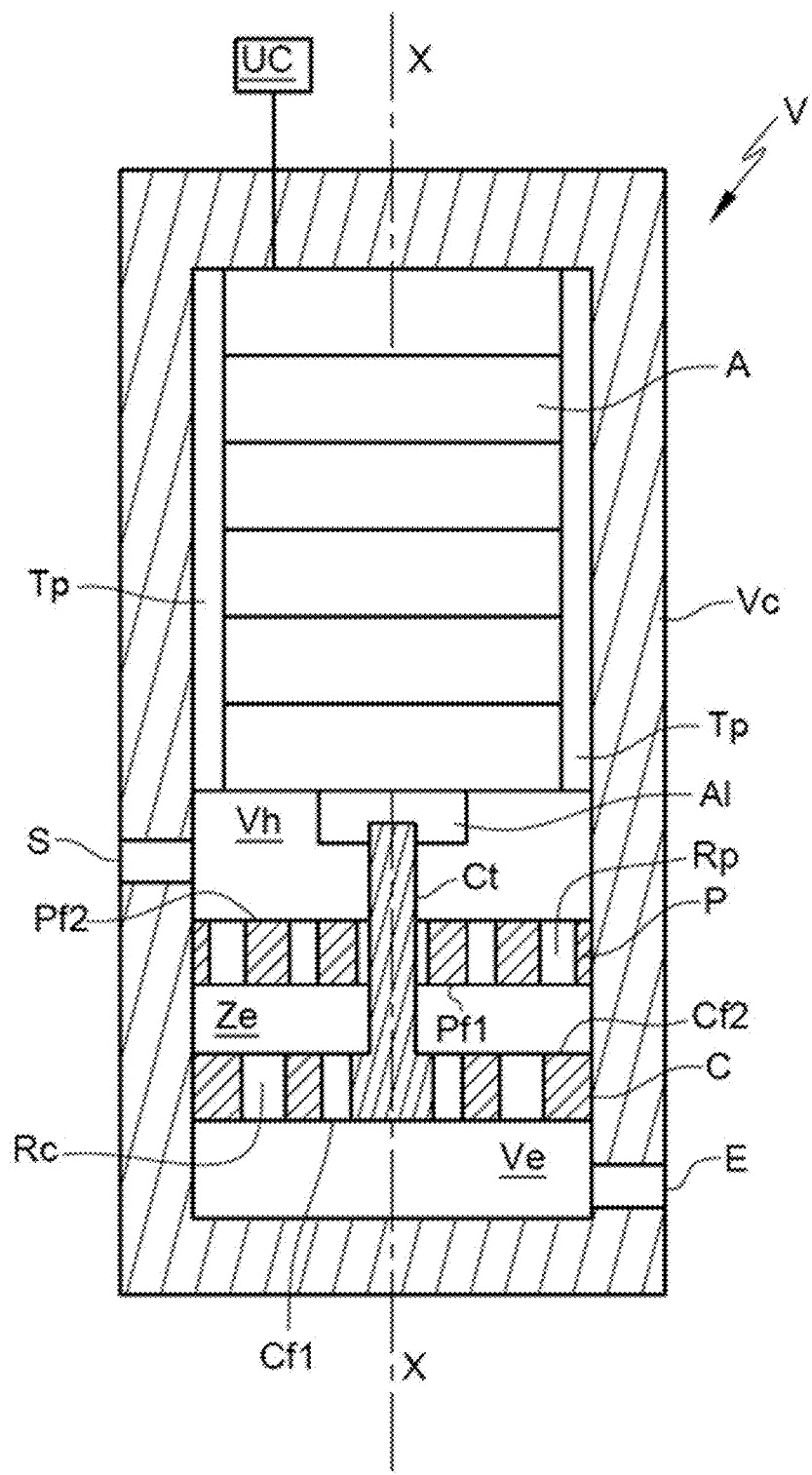

[Fig. 7b]
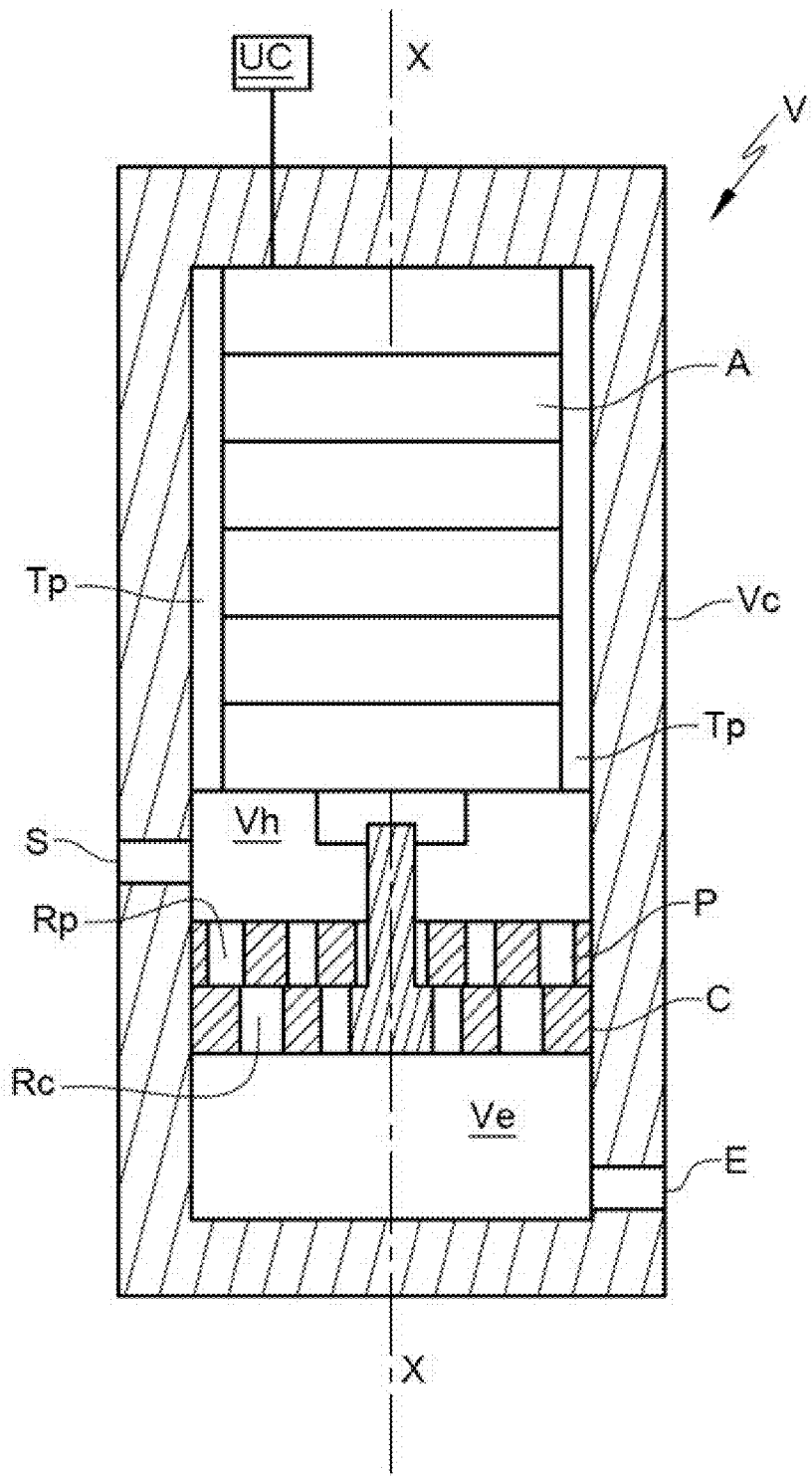

[Fig. 8]
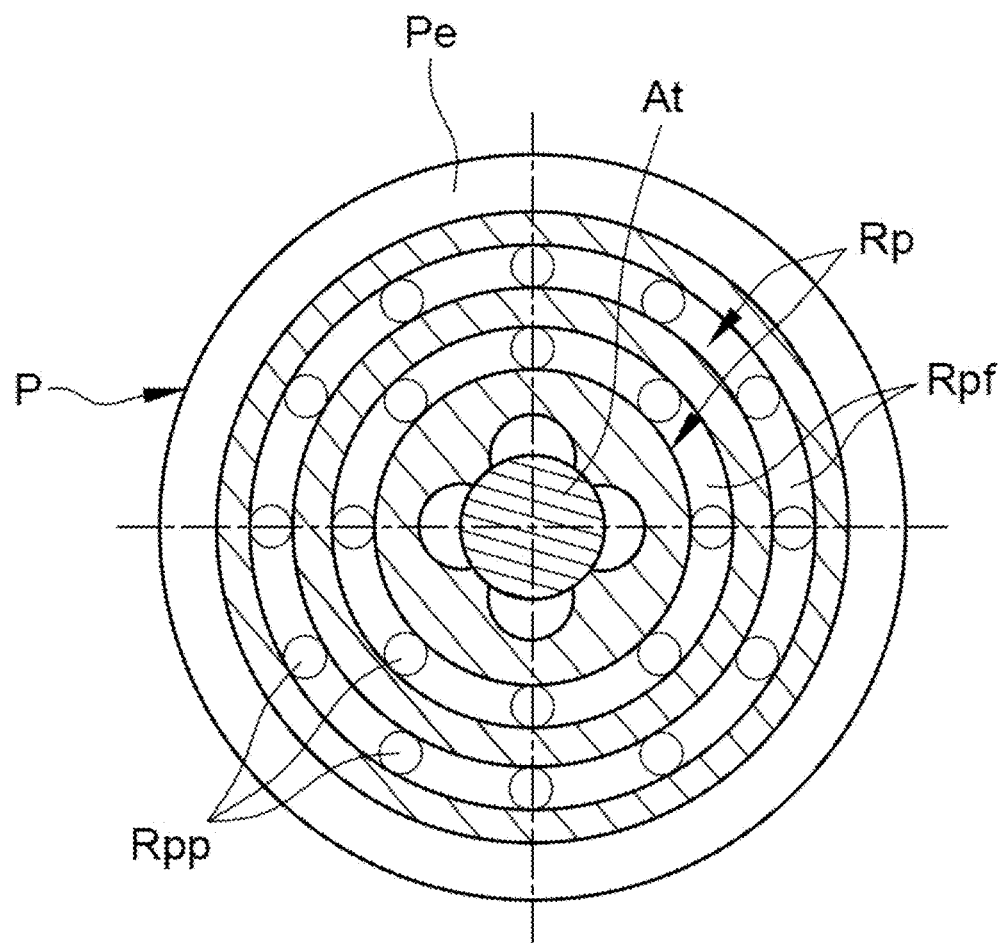

[Fig. 9]
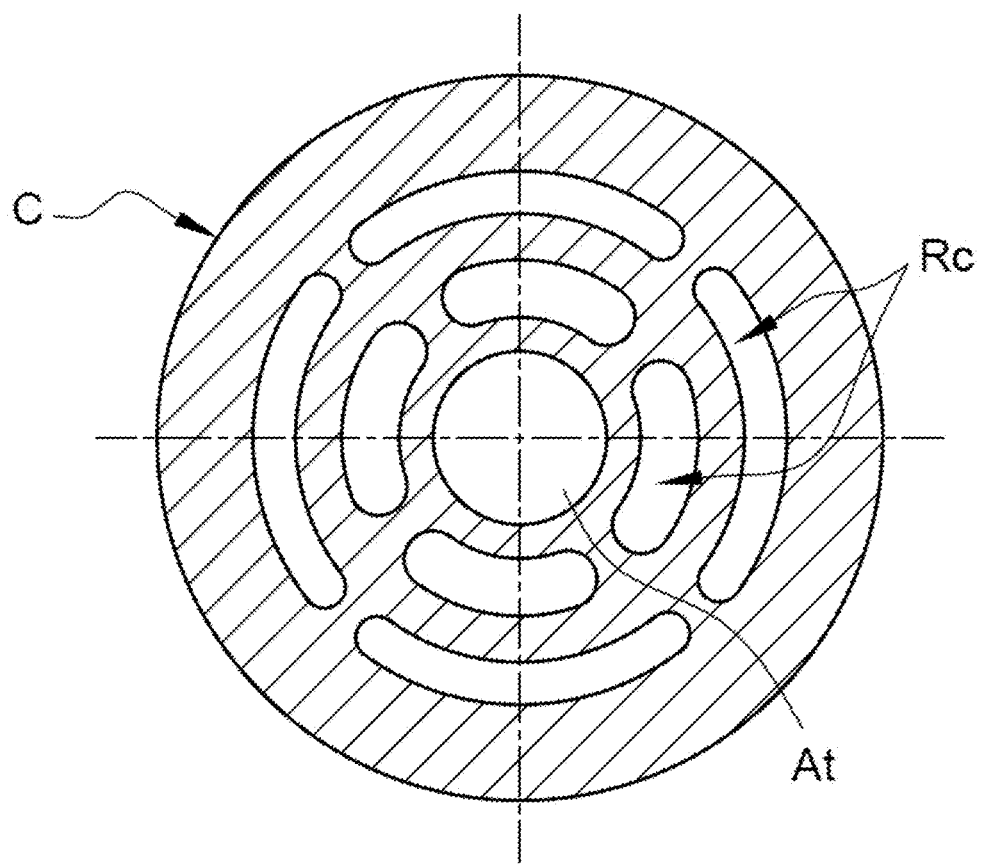

[Fig. 10]
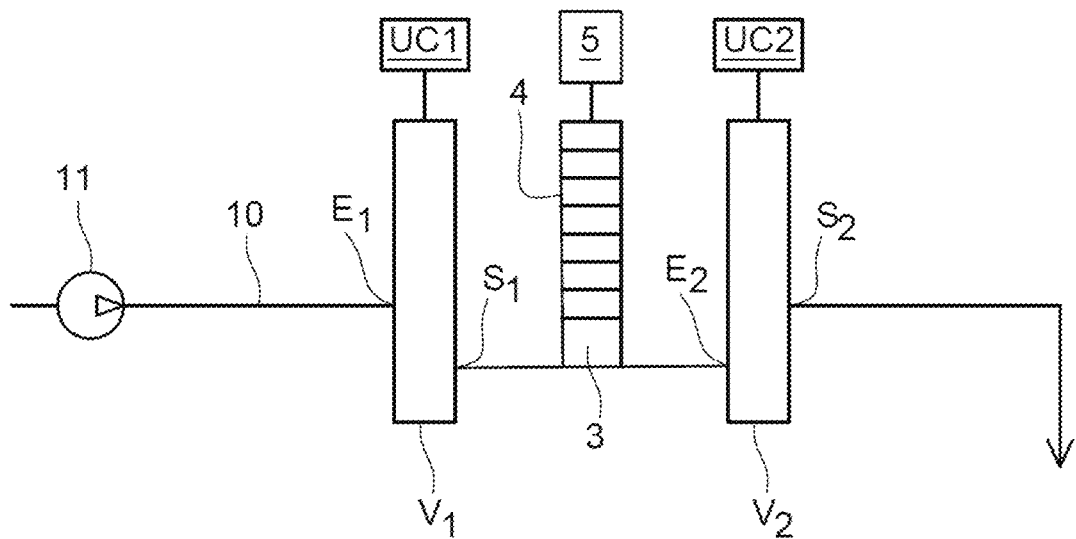
[Fig. 11]
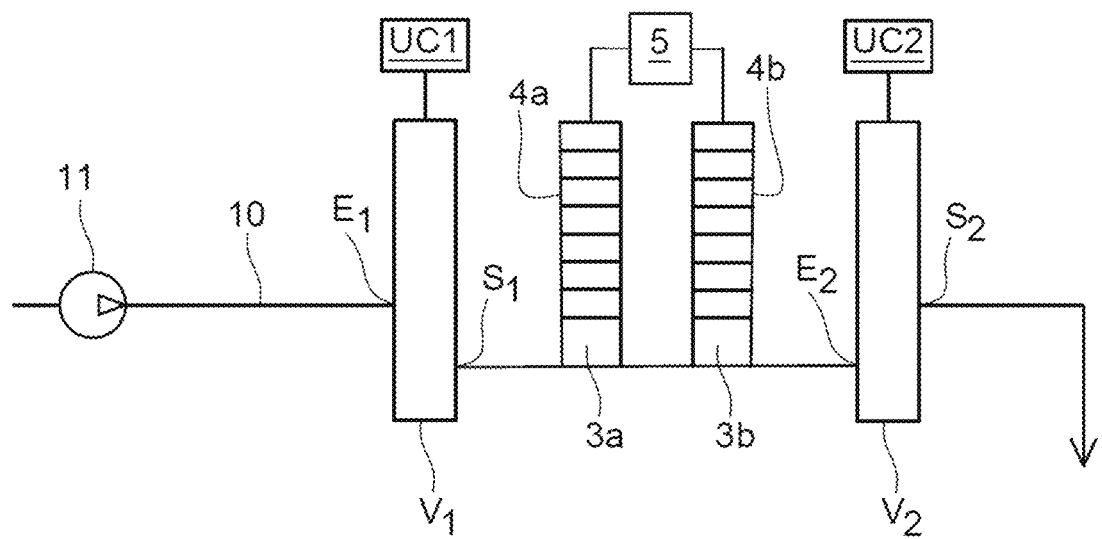

VALVE COMPRISING A PIEZOELECTRIC ACTUATOR

TECHNICAL FIELD

The present invention relates to a valve comprising a piezoelectric actuator and a process for accelerating the opening/closing of such a valve. The invention further relates to a system for generating electricity including such a valve.

The invention relates to the technical field of valves using a piezoelectric actuator for controlling their opening/closing and more specifically, but not exclusively, the field of ultra-fast valves (opening/closing time equal to or less than 1.5 ms).

BACKGROUND

Hereinafter, the invention is illustrated mainly in relation to a hydraulic fluid, but obviously the invention is not limited to this application and may be used with a gaseous fluid.

Hydraulics is used in many fields thanks to its very high power density (power per unit of volume). For example, its frequent use is observed in devices such as lifting machinery, wind turbines, or in precision fields such as aeronautics, drones or spacecraft.

Valves are generally used to optionally supply several actuators integrated in these nominal-power devices, by blocking fluid or allowing it to flow. Ultra-fast valves are particularly advantageous for optionally supplying these actuators at high frequency, according to the desired power. Indeed, the shorter the response time of the valve, the greater the precision of the overall system and the greater the number of actuators that can be used, thus gaining in energy efficiency.

The prior art describes a large number of valves which are essentially divided into two major families: hydraulic control valves and electric control valves.

Hydraulic control valves are opened and closed by responding to a pressure control (in a secondary circuit). These valves have a minimum response time of 1.5 ms to 2 ms for the best, but are bulky because of their multiple stages and require a constant high-pressure fluid supply.

Electric control valves are opened and closed by responding to an electric control. These valves have a minimum response time of 3 ms to 4 ms for the best. This type of valve allows more direct control, particularly using electrical signals which control electromagnetic actuators (solenoid type). However, their response time is relatively long essentially on account of the inertia of the windings used. Furthermore, the force density supplied by these electromagnetic actuators is generally low (depending on winding size).

Piezoelectric actuator integration in an electric control valve makes it possible to increase its performances, not only in terms of response time, but also in terms of force density. However, the movement of a piezoelectric actuator is generally small (some tens of microns), such that the flow of fluid likely to pass through the valve is low.

To remedy this, so-called "Hörbiger plate" valves have been developed, in particular by the University of Bath (hereinafter referred to as "Bath valve") and described in the following publications:

David T. Branson et al. "*Dynamic simulation model of hydraulic valve utilising the Hörbiger plate principal and piezoactuation to achieve high bandwidth and flow performance*". Proceedings of the IMECE2008-67401, 2008 AMCE.

David. T. Branson et al. "*Piezoelectrically actuated hydraulic valve design for high bandwidth and flow performance*". Proceedings of the Institution of Mechanical Engineers, Part I: Journal of Systems and Control Engineering, 2011, pp. 225-345.

The Bath valve comprises a fixed plate P and a movable flap C opposite said plate. The principle is based on fluid flow channels presented in the form of annular grooves Rp, Rc arranged in the plate and the flap. As illustrated in FIG. 1a, when the flap C is spaced apart from the plate P, the fluid F flows through the channels Rp, Rc, the annular groove configuration of which increases the overall flow surface area considerably compared to conventional valve configurations. It is thus possible to obtain high flow rates even with a small movement $x_s$ of the flap C (of some tens of microns). The fluid flow rates capable of flowing through the valve are approximately 65 L/min at 20 bar (2 MPa) with opening/closing times of less than 1.5 ms. In the closing position (FIG. 1b), the flap C in is contact with the plate P such that the channels Rp, Rc are no longer in fluidic communication.

With reference to FIGS. 2a and 2b, the Bath valve comprises a pressurised fluid inlet E and a fluid outlet S. In the opening position (FIG. 2b), the flap C is spaced apart from the fixed plate P such that the fluid flows from the inlet E, to the outlet S, passing through the channels Rc, Rp. A piezoelectric actuator A is disposed in a first chamber Vh and acts upon an active face of the flap C so as to move it between the closing position (FIG. 2a) and the opening position (FIG. 2b). The inlet E (high pressure) is disposed upstream from the plate P and is connected fluidically to the channels Rp of the plate P. The outlet S (low pressure) is connected fluidically to the channels Rc of the flap C such that in use, in the opening position, the fluid F flows from the channels Rp of the plate P to the channels Rc of the flap C.

The Bath valve is advantageous, but has some limitations. Firstly, the maximum actual (and not simulated) operating pressure is of the order of 10 bar to 20 bar, serious leak problems appearing beyond these pressures. The scope of the Bath valve is therefore limited. Secondly, if the opening/closing times are short (from 1 ms to 1.5 ms), they remain of the same order of magnitude as the most effective hydraulic control valves on the market. For these reasons, there is not really any practical benefit of using a Bath valve in an industrial device.

Other piezoelectric actuator valves are also known from patent documents US2013/0048898 and US2017/0211716. In document US2013/0048898, a leaf spring is engaged with the flap to actuate it to the closing or opening position according to the embodiment selected. With this design, when the valve is subjected to high fluid pressures, its opening/closing times are relatively slow, in particular on account of the pressure force exerted on the active face of the flap. The same applies for the valve described in document US2017/0211716, insofar as the pressure force exerted on the active face of the flap brakes the movement of the flap to the opening or closing position.

The aim of the invention is that of remedying all or some of the aforementioned drawbacks. In particular, the present invention aims to provide a valve in which the design is based on the Bath valve principle (Hörbiger plate type valve with piezoelectric actuator) which, under actual conditions of use (and not only under simulated conditions), is capable of functioning at pressure markedly greater than 20 bar, potentially up to several hundred bar. A further aim of the invention is that of providing a valve in which the opening/closing times are reduced with respect to the valves of the prior art, in particular when said valve is subjected to high fluid pressures (≥100 bar).

SUMMARY

The solution proposed by the invention is a valve comprising a pressurised fluid inlet and a fluid outlet, said valve including:
- a fixed plate wherein first fluid flow channels are arranged,
- a flap wherein second fluid flow channels are arranged, said flap being movably mounted between: —an opening position wherein the first channels and the second channels are in a configuration allowing the flow of the fluid between the inlet and the outlet; —and a closing position wherein the first channels and the second channels are in a configuration blocking the flow of the fluid between the inlet and the outlet, said inlet being arranged in such a way that, in use, the pressurised fluid exerts a pressure force on an active face of said flap stressing said flap to the closing position
- a piezoelectric actuator acting upon the flap to move it between the closing position and the opening position, said actuator consisting of a piezoelectric pillar formed by a piezoelectric element stack structure, said pillar lengthening when the actuator is switched on and retracting when said actuator is not switched on.

The operation of the valve according to the invention is inverted with respect to the Bath valve. The pressurised fluid now acts upon the movable flap in the closing direction whereas in the Bath valve, the fluid pressure acts upon the movable flap in the opening direction. In other words, in the invention, the high pressure position is located upstream from the movable flap and acts mechanically in the direction of the piezoelectric actuator during the closing phase, thus helping improve the tightness of the valve. Thus, the more the fluid pressure increases, the better the tightness, such that the valve can now function at pressures greater than 100 bar and potentially up to several hundred bar.

According to an embodiment, the actuator is furthermore axially prestressed by means of one or more prestress rods forming spring elements in which the return force acts in the piezoelectric pillar retraction direction.

These prestress rods make it possible to increase the piezoelectric pillar retraction speed. The applicant observed that the opening and closing times were of the order of 0.5 ms, which is much faster than the valves of the prior art.

Furthermore, due to its relatively simple design and its actual performances, the valve according to the invention is industrially usable, with reduced manufacturing costs.

Other advantageous features of the valve according to the invention are listed hereinbelow. Each of these features may be considered alone or in combination with the features defined hereinabove. Each of these features contributes, where appropriate, to the resolution of specific technical problems defined hereinbefore in the description and to which the remarkable features defined hereinabove do not necessarily contribute. The latter may, where appropriate, be the object of one or more divisional patent application(s):

According to an embodiment making it possible to obtain better results in terms of opening/closing speed, the prestress force applied by the prestress rod(s) on the piezoelectric pillar is between 5% and 20% of the mechanical force delivered by said piezoelectric pillar alone (i.e. without prestress) and/or the prestress rod(s) have a rigidity between 10% and 20% of the rigidity of the piezoelectric pillar alone.

According to an embodiment, in the opening position, the flap is spaced apart from the plate in such a way that the first channels and the second channels are in fluidic communication. And in the closing position, the flap in is contact with the plate in such a way that the first channels and the second channels are not in fluidic communication.

According to an embodiment: —the flap is movably mounted in a chamber between the opening position and the closing position; —the second channels are in fluidic communication with the chamber; —the inlet is disposed upstream from the flap, at the chamber; —the outlet is disposed downstream from the plate, in fluidic communication with the first channels such that, in use and in the opening position, the fluid flows from the second channels to said first channels.

According to an embodiment, the piezoelectric actuator is configured in such a way that the flap is naturally in the opening position when said actuator is not switched on, the prestress rod(s) being configured in such a way that the return force exerted by said rod(s) acts against the pressure force exerted, in use, on the active face of said flap when said flap switches from the closing position to the opening position.

According to an embodiment, the piezoelectric actuator is configured in such a way that the flap is naturally in the closing position when said actuator is not switched on, the prestress rod(s) being configured in such a way that the return force exerted by said rod(s) is combined with the pressure force exerted, in use, on the active face of said flap when said flap switches from the opening position to the closing position According to an embodiment, the flap is disposed between the actuator and the plate.

According to an embodiment, the plate is disposed between the actuator and the flap.

According to an embodiment: —the piezoelectric elements of the actuator are mounted on a prestress rod installed along an axis of translation; —the rod is engaged with the flap in such a way that a translation of said rod induced by the piezoelectric actuator produces the translation of said flap between the opening and closing positions.

According to an embodiment, the plate has a central orifice wherein the rod is housed, said orifice acting as a guide for said rod.

According to an embodiment: —the piezoelectric actuator has, at one of its ends, a connection part on which the flap is attached; —the flap includes, at one face, a projecting element adapted to be attached to the connection part.

According to an embodiment: —the flap includes, at another face, another projecting element extending towards the plate; —the plate has a central orifice wherein said other projecting element is housed, said orifice acting as a guide for said other projecting element.

A further aspect of the invention relates to a system for generating electricity including:
- a circuit wherein a pressurised fluid circulates,
- at least one fluidic cavity arranged on at least one portion of the circuit, said cavity housing a piezoelectric generator connected to an electronic load extraction circuit capable of recovering the electrical energy from said piezoelectric generator, and wherein:
- the fluidic cavity is installed between two valves according to one of the preceding features, respectively an intake valve and an exhaust valve, in a first operating sequence, the intake valve is controlled so that its flap is in the opening position and the exhaust valve is controlled so that its flap is in the closing position, in such a way that the pressurised fluid enters and fills at least partially the fluidic cavity so as to induce a mechanical pressure on the piezoelectric generator, said pressure producing a deformation of said generator generating an electrical energy recovered by the electronic load extraction circuit, in a second operating sequence, the intake valve is controlled so that its flap is in the closing position and the exhaust valve is controlled so that its flap is in the opening position, in such a way that the pressurised fluid is discharged from the fluidic cavity and the piezoelectric generator is no longer stressed.

According to an embodiment, the opening/closing frequency of the intake and exhaust valves is controlled in such a way that it corresponds to the resonance frequency of the piezoelectric generator.

According to an embodiment, the intake valve is such that the flap is disposed between the actuator and the plate. And the exhaust valve is such that the plate is disposed between the actuator and the flap.

A further aspect of the invention relates to a process for accelerating the opening/closing of a valve, said valve comprising a pressurised fluid inlet and a fluid outlet, and including:
- a fixed plate wherein first fluid flow channels are arranged,
- a flap wherein second fluid flow channels are arranged, said flap being movably mounted between: —an opening position wherein the first channels and the second channels are in a configuration allowing the flow of the fluid between the inlet and the outlet; —a closing position wherein the first channels and the second channels are in a configuration blocking the flow of the fluid between the inlet and the outlet,
- a piezoelectric actuator acting upon the flap to move it between the closing position and the opening position, said actuator consisting of a piezoelectric pillar formed by a piezoelectric element stack structure, said pillar lengthening when the actuator is switched on and retracting when said actuator is not switched on.

This process is remarkable in that it comprises the steps of: arranging the inlet in such a way that, in use, the pressurised fluid exerts a force on an active face of the flap stressing said flap to the closing position; and axially prestressing the actuator by means of one or more prestress rods in which the return force acts in the piezoelectric pillar retraction direction.

BRIEF DESCRIPTION OF THE FIGURES

Other advantages and features of the invention will appear more clearly upon reading the description of a following preferred embodiment, with reference to the appended drawings, made as indicative and non-limiting examples and wherein:

FIG. 1a cited hereinabove illustrates the operating principle of a Hörbiger plate type valve, the valve being in the opening position.

FIG. 1b cited hereinabove illustrates the operating principle of a Hörbiger plate type valve, the valve being in the closing position.

FIG. 2a cited hereinabove is a schematic sectional view of a Bath valve of the prior art, the flap being in the closing position.

FIG. 2b cited hereinabove is a schematic sectional view of a Bath valve of the prior art, the flap being in the opening position.

FIG. 3 is a schematic representation showing the arrangement of a valve according to the invention in an installation.

FIG. 4a is a schematic sectional view of a valve according to a first embodiment of the invention, the flap being in the opening position.

FIG. 4b is a schematic sectional view of the valve of FIG. 4a, the flap being in the closing position.

FIG. 5a is a schematic sectional view of a valve according to a second embodiment of the invention, the flap being in the opening position.

FIG. 5b is a schematic sectional view of the valve of FIG. 5a, the flap being in the closing position.

FIG. 6a is a schematic sectional view of a valve according to a third embodiment of the invention, the flap being in the opening position.

FIG. 6b is a schematic sectional view of the valve of FIG. 6a, the flap being in the closing position.

FIG. 7a is a schematic sectional view of a valve according to a fourth embodiment of the invention, the flap being in the opening position.

FIG. 7b is a schematic sectional view of the valve of FIG. 7a, the flap being in the closing position.

FIG. 8 is a sectional view along A-A of the plate illustrated in FIG. 4a.

FIG. 9 is a sectional view along B-B of the flap illustrated in FIG. 4a.

FIG. 10 is a schematic representation showing the arrangement of a piezoelectric generator in a system according to the invention.

FIG. 11 is a schematic representation showing the arrangement of a several piezoelectric generators in a system according to the invention.

DETAILED DESCRIPTION OF THE EMBODIMENTS

As used here, and unless specified otherwise, the use of the ordinal adjectives "first", "second", etc., to describe an object merely indicates that different occurrences of similar objects are mentioned and does not imply that the objects thus described must be in a given sequence, whether over time, in space, in a ranking, etc. The adverbs "upstream" and "downstream" are used relative to the flow of the fluid in the valve and/or the hydraulic circuit wherein the valve is installed.

With reference to FIG. 3, the valve V according to the invention is essentially intended to be integrated in a conduit 10 to allow or prevent fluid circulation in said conduit. According to an embodiment, the conduit 10 is provided with a pump 11 intended to pressurise the fluid. The conduit 10 is also connected to a fluid reservoir 12. Various actuators and/or devices 13a, 13b, 13c (cylinder, pump, motor, brake, etc.) may be connected to the different portions of the conduit: between the pump 11 and the valve V and/or between the valve V and the reservoir 12 and/or between the reservoir 12 and the pump 11. The valve V may also be used in a system for generating electricity as explained hereinabove in the description.

The invention is illustrated mainly in relation to a hydraulic liquid, but obviously the invention is not limited to this application and may be used with other fluids, in particular a gaseous fluid. The hydraulic liquid may be used as power transmission means in a hydraulic system. It consists for example of an incompressible mineral oil capable of transmitting the energy from a pump quickly to the actuators and/or devices 13a, 13b, 13c.

The valve V of the Bath valve type, i.e. a Hörbiger plate type valve moved by a piezoelectric actuator. It comprises a pressurised fluid inlet E and a fluid outlet S. According to an embodiment, the outlet S is a low-pressure outlet, for example connected to the reservoir 12 set to atmospheric pressure (1 bar). According to another embodiment, the outlet S is an outlet where the fluid is always pressurised. The valve V includes a fixed plate P and a movable flap C opposite said plate.

For easier assembly and design, the plate P has a general cylindrical shape of circular cross-section. In FIGS. 4a and 4b, it has a shoulder Pe ensuring its positioning in the valve body Vc. The valve body Vc is rigid, for example made of steel, preferably obtained by moulding and machining.

The plate P has a first face Pf1 and a second face Pf2 that are opposite. The first face Pf1 is facing the flap C. The plate P is rigid. According to a preferred embodiment, it is made of steel, preferably obtained by machining. Its diameter is for example between 10 mm and 50 mm, and its height (or thickness) between 2 mm and 10 mm. The plate P is held in position in the valve body Vc, for example by a clamped fit or by welding.

First fluid flow channels Rp are arranged in the plate P. According to the embodiment of FIG. 8, these channels Rp are presented in the form of concentric annular grooves, the number of which may vary from 1 to 10 according to the diameter of the plate P. For example, the grooves Rp have a width between 0.5 mm and 10 mm and a depth between 0.5 mm and 10 mm. According to the embodiment of FIGS. 4a, 4b and 8, the grooves Rp open at the first face Pf1, but are not through, i.e. they are not produced in the entire thickness of the plate P. In other words, they have a back wall Rpf. Holes Rpp are produced at the back wall Rpf and open at the second face Pf2. The channels Rp are therefore formed of the annular grooves and the holes Rpp. The diameter of the holes Rpp corresponds to the width of the grooves Rp. Their number may vary from 4 to 20 per groove. This design has several advantages: it makes it possible to obtain a particularly rigid plate P which prevents or limits deformations and therefore leak risks. It furthermore makes it possible to generate negligible head losses during fluid flow.

According to another embodiment, the channels Rp are presented in the form of concentric annular groove segments, the number of which may vary from 1 to 10 according to the diameter of the plate P. For example, the groove segments Rp have a width between 0.5 mm and 10 mm and a depth corresponding to the thickness of the plate P. According to an embodiment, the groove segments Rp are through, i.e. they are produced in the entire thickness of the plate P and open at the first face Pf1 and the second face Pf2. This design makes it possible to obtain a rigid plate P which prevents or limits deformations. Negligible head losses during fluid flow are furthermore observed. This design is similar to that of the first channels Rp described hereinabove in the description, in particular with reference to FIG. 9.

For easier assembly and design, the flap C also has a general cylindrical shape of circular cross-section, and more generally with the same shape, or substantially the same shape, as the plate P. The flap C is rigid, for example made of steel, preferably obtained by moulding and machining. It is movably mounted between an opening position (FIGS. 4a, 5a, 6a, 7a) and a closing position (FIGS. 4b, 5b, 6b, 7b).

With reference to FIGS. 4a and 4b, the flap C has a first face Cf1 and a second face Cf2 that are opposite. The second face Cf2 of the flap C is facing the first face Pf1 of the plate P. According to a preferred embodiment, the flap C is made of steel, preferably obtained by machining. Its diameter corresponds to that of the plate P and is for example between 10 mm and 50 mm, its height (or thickness) being between 2 mm and 10 mm.

Second fluid flow channels Rc are arranged in the plate P. According to the embodiment of FIG. 9, these channels Rc are presented in the form of concentric annular groove segments, the number of which may vary from 1 to 10 according to the diameter of the flap C. For example, the groove segments Rc have a width between 0.5 mm and 10 mm and a depth between 0.5 mm and 10 mm. According to the embodiment of FIGS. 4a, 4b, 5a, 5b, 6a, 6b, 7a, 7b and 9, the groove segments Rc are through, i.e. they are produced in the entire thickness of the flap C and they open at the first face Cf1 and the second face Cf2. This design makes it possible not only to obtain a particularly rigid flap C which prevents or limits deformations, but also generate negligible head losses during fluid flow.

The first channels Rp and the second channels Rc are in a cooperation configuration. With reference to FIGS. 4a, 4b, 8 and 9, the plate P and the flap C have, respectively at the first Pf1 and the second face Cf2, hollow parts (corresponding to the channels Rp, Rc) and solid parts bordering said hollow parts (corresponding to the hatched zones).

When the flap C and the plate P are facing, the first channels Rp of said plate is disposed facing the solid parts of said flap. And the second channels Rc of the flap C are disposed facing the solid parts of the plate P. In the closing position (FIGS. 4b, 5b, 6b, 7b), when the flap C is in contact with the plate P, the first channels Rp are sealed by the solid parts of said flap and the second channels Rc are sealed by the solid parts of said plate. Thus, in the closing position, the first channels Rp and the second channels Rc are not in fluidic communication. To seal the channels Rp, Rc effectively, the complementary solid parts are wider than said channels, for example wider by 0.2 mm to 2 mm.

Conversely, in the opening position (FIGS. 4a, 5a, 6a, 7a), the flap C is spaced apart from the plate P, the first channels Rp are no longer sealed by the solid parts of said flap and the second channels Rc are no longer sealed by the solid parts of said plate. The first channels Rp and the second channels Rc are then in fluidic communication.

The flap C is moved between the closing position and the opening position, by a piezoelectric actuator A adapted to produce a mechanical energy when it is electrically polarised. The actuator A consists of a piezoelectric element stack structure (also referred hereinafter as "piezoelectric pillar") or of a piezoelectric membrane. The piezoelectric elements are presented advantageously in the form of piezoceramic or piezocomposite washers or disks in which the diameter is for example between 5 mm and 50 mm. The number of washers or disks may vary from 3 to 400 according to the length of the pillar (which may be between 5 mm and 200 mm) and/or according to the mechanical force to be generated. For example, hard PZT (Lead Zirconate Titanate) ceramic washers are used. In the case of a piezoelectric membrane, it consists advantageously of a compound of the polyvinylidine difluoride (PVDF) family, more particularly a PVDF derivative such as a PVDF/PDMS (PDMS: polydimethylsiloxane).

When the actuator A is switched on, its piezoelectric elements are polarised and elastically deform to generate a mechanical stress. According to an embodiment, the elastic deformation consists of an elongation of the piezoelectric pillar along the longitudinal axis X-X of the actuator A, which is also the axis of translation of the flap C. In other words, the actuator A lengthens when it is switched on. And when it is not switched on, the actuator A retracts and returns to its original position.

Switching on the actuator A is managed by a control unit UC which may for example be presented in the form of a processor, microprocessors, CPU (Central Processing Unit), integrated in an electronic device (computer, PLC, etc.). For example, the control signal generated by the control unit UC and applied to the actuator A may have a voltage between 0 V and 1000 V, at a current of 2 A to 10 A. The activation frequency of the actuator A (opening/closing frequency of the valve V) may reach 2000 Hz. The control unit UC can adapt the control signal, in voltage and/or in current to optimise the performances in terms of speed (opening/closing time) and/or movement precision of the flap C, and/or noise emitted, etc. For example, a sinusoidal control signal reduces the noise generated by the movement of the flap C compared to a square control signal.

The actuator A is dimensioned to move the flap C by a distance $x_s$. In other words, in the opening position, the distance separating the first face Pf1 of the plate P from the second face Cf2 of the flap is $x_s$. This distance is advantageously between 20 µm and 150 µm. The fluid flow rate capable of passing through the valve V may be readily controlled by setting the voltage applied to the actuator A, said setting making it possible to adjust the deformation of said actuator and hence this distance $x_s$. For example, for a movement distance $x_s$ of approximately 80 µm, a flow rate of 10 L/min for a fluid at 5 bar, a flow rate of 15 L/min for a fluid at 10 bar and a flow rate of 80 L/min for a fluid at 300 bar are obtained.

First Embodiment: FIGS. 4a and 4b

In FIGS. 4a and 4b, the flap C is disposed at the first chamber Vh. In other words, the first chamber Vh is disposed on either side of the actuator A and the flap C. In other words, the flap C is disposed between the actuator A and the plate P.

The piezoelectric elements are mounted on a rod At installed along the axis X-X. The piezoelectric elements may in particular be perforated along the axis X-X which makes it possible to insert the rod At therein. The elongation or retraction of the actuator A induces a translation of the rod At along the axis X-X.

According to an embodiment, when the actuator A is switched on, it lengthens in such a way that the flap C is moved to the closing position. And when it is not switched on, the actuator A retracts and returns to its original position, the flap C then moving towards the opening position. In this assembly, the valve V is therefore naturally open: the flap C is in the opening position when the actuator A is not switched on. An opposite assembly may however be envisaged, wherein the valve V is naturally closed, the flap C being in the closing position when the actuator A is not switched on (and which lengthens and returns to its original position).

According to a preferred embodiment, the actuator A is dimensioned to deliver a mechanical force between 1000 N (Newton) and 10000 N.

According to an embodiment, the rod At is engaged with the flap C in such a way that the translation of said rod produces the translation of said flap between the opening and closing positions. The flap C may be secured to the rod At by clamped fit, by welding, by screwing or any other solution suitable for a person skilled in the art.

The rod At extends towards the plate P. The latter has a central orifice acting as a guide for the rod At. This design makes it possible to guide the translation of the flap C with precision between the opening and closing position and ensure optimal cooperation of said flap and the plate in the closing position.

The second channels Rc are arranged in the flap C in such a way that they open into the first chamber Vh at the first face Cf1 and/or are in fluidic communication with said chamber. The first face Cf1 is hereinafter referred to as "active face" of the flap C. This active face Cf1 also has hollow parts (corresponding to the channels Rc) and solid parts bordering said hollow parts, in an arrangement which may be similar to that of FIG. 9. The inlet E of the valve V is disposed upstream from the valve C, at the first chamber Vh, and the outlet S is disposed downstream from the plate P, at a second flow chamber Ve, in fluidic communication with the first channels Rp. In this configuration, in the opening position, the circulation of the fluid through the valve V is as follows: i) the fluid enters the first chamber Vh via the inlet E, ii) the fluid flows through the flap C via the second channels Rc, from the first face Cf1 to the second face Cf2, iii) the fluid flows in the spacing zone Ze separating the flap C from the plate P, iv) the fluid flows through the plate P via the first channels Rp, from the first face Pf1 to the second face Pf2, v) the fluid outflows from the valve V via the second chamber Ve and the outlet S.

When the pressurised fluid enters the first chamber Vh, it exerts a force on the active face Cf1 of the flap C, and more particularly on its solid parts. This force is oriented towards the plate P in such a way that the flap C is stressed to the closing position. In the closing position, this pressure force is combined with that exerted by the actuator A to press with a maximum stress said flap against the plate P. This helps substantially improve the tightness of the valve V in the closing position.

Second Embodiment: FIGS. 5a and 5b

The positioning of the plate P and of the flap C corresponds to that of the first embodiment: the plate P is disposed at the second chamber Ve and the flap C at the first chamber Vh (the flap C is disposed on either side of the actuator A and the plate P). And the operation of the valve V is similar to that described with reference to the first embodiment.

This second embodiment differs from the first embodiment by the cooperation of the flap C with the actuator A. The latter is no longer provided with a central rod. It has, at one of its ends, a connection part Al on which the flap C is attached. According to an embodiment, the flap C includes, at its active face Cf1, a projecting element Ct presented for example in the form of a rod or tenon, adapted to be attached to the connection part Al, for example by screwing.

The flap C includes, at its other face Cf2, another projecting element Cg presented for example in the form of a rod or tenon, which extends towards the plate P. The latter has a central orifice acting as a guide and wherein the projecting element Cg is housed. Therefore, it is now the cooperation of this other projecting element Cg with the orifice for guiding the plate P that makes it possible to guide the translation of the flap C with precision between the opening and closing position and ensure optimal cooperation of said flap and said plate in the closing position.

Third Embodiment: FIGS. 6a and 6b

As in the first embodiment, the rod At is engaged with the flap C in such a way that the translation of said rod produces the translation of said flap.

However, the positioning of the plate P and the flap C is reversed with respect to that of the first two embodiments: the flap C is disposed at the second chamber Ve and the plate P at the first chamber Vh. The first chamber Vh is therefore now disposed on either side of the actuator A and the fixed plate P. In other words, it is now the plate P that is disposed between the actuator A and the flap C.

According to an embodiment, when the actuator A is switched on, it lengthens in such a way that the flap C is moved to the opening position. And when it is not switched on, the actuator A retracts and returns to its original position, the flap C then moving towards the closing position. In this assembly, the valve V is therefore naturally closed: the flap C is in the closing position when the actuator A is not switched on. An opposite assembly may however be envisaged, wherein the valve V is naturally open, the flap C being in the opening position when the actuator A is not switched on (and which retracts and returns to its original position).

The second channels Rc of the flap C open into the second chamber Vh at the active face Cf1 and/or are in fluidic communication with said chamber. The inlet E is disposed at the second chamber Ve and the outlet S is disposed at the first chamber Vh, in fluidic communication with the first channels Rp. In this configuration, in the opening position, the circulation of the fluid through the valve V is as follows: i) the fluid enters the second chamber Ve via the inlet E, ii) the fluid flows through the flap C via the second channels Rc, from the first face Cf1 to the second face Cf2, iii) the fluid flows in the spacing zone Ze separating the flap C from the plate P, iv) the fluid flows through the plate P via the first channels Rp, from the first face Pf1 to the second face Pf2, v) the fluid outflows from the valve V via the first chamber Vh and the outlet S.

When the pressurised fluid enters the second chamber Ve, it exerts a force on the active face Cf1 of the flap C. This force is oriented towards the plate P in such a way that the flap C is stressed to the closing position. In the closing position, this pressure force helps press the flap against the plate P with a maximum stress. This helps substantially improve the tightness of the valve V in the closing position.

Fourth Embodiment: FIGS. 7a and 7b

The operation of the valve V and the positioning of the plate P and of the flap C correspond to those of the third embodiment: the plate P is disposed at the first chamber Vh and the flap C at the second chamber Ve (the plate P is disposed on either side of the actuator A and the flap C).

And the cooperation of the flap C with the actuator A and the plate C corresponds substantially to that described with reference to the second embodiment. The actuator A has, at one of its ends, a connection part Al on which the flap C is attached. According to an embodiment, the flap C includes, at its face Cf2, a projecting element Ct presented for example in the form of a rod or tenon, adapted to be attached to the connection part Al, for example by screwing. This projecting element Ct passes through a central orifice of the plate P acting as a guide.

This fourth embodiment therefore combines the advantages of the second and third embodiments.

Regardless of the embodiment, it is observed that the higher pressure of the fluid, the higher the pressure stress exerted on the flap C in the closing position, hence helping improve the tightness of the valve V. Compared to the Bath valve cited hereinabove, the valve V according to the invention is therefore not limited in pressure.

Furthermore, in the Bath valve, the opening/closing times are limited by the maximum pressure of use. The valve V according to the invention not being subject to this limit, the opening/closing times may be reduced further and be of the order of 0.5 ms, or less. In particular, when the flap C moves from the opening position to the closing position, the pressure force exerted by the fluid on said flap tends to accelerate its movement. In addition, the higher the pressure, the shorter the closing time of the valve V. The applicant observed experimentally that for a movement distance $x_s$ of approximately 80 μm and for a fluid at 5 bar, the opening/closing times were less than 0.5 ms (of the order of 0.3 ms). A reduction of this opening/closing time by 10% to 100 bar and by 20% to 300 bar is observed.

Prestress Rod(s)

Regardless of the embodiment, the actuator A is advantageously prestressed to improve the mechanical strength of the piezoelectric pillar. An axial prestress is applied on the piezoelectric pillar, by compressing said pillar.

In the first embodiment (FIG. 4a, 4b) and the third embodiment (FIGS. 6a, 6b), one or more fastener elements Atv are engaged with the rod At so as to apply this prestress on the piezoelectric pillar.

In the second embodiment (FIGS. 5a, 5b) and the fourth embodiment (FIGS. 7a, 7b), the prestress is generated by rods Tp placed at the periphery of the pillar, for example three rods Tp placed at 120°, engaged with fastener elements and providing the connection between the part Al and the end of said pillar. It will be understood that the rod(s) Tp may be used in the first and third embodiments (in addition to or to replace the fastener elements Atv) and that the fastener elements Atv may be used in the second and fourth embodiments (in addition to or to replace the rods Tp).

For example, the rods At, Tp are made of STUBS® steel, their diameter being between 1 mm and 5 mm and their length between 80 mm and 200 mm.

The or these prestress rod(s) At, Tp have a dual function. On one hand, they make it possible to subject the piezoelectric pillar to permanent axial compression stress for in particular providing a permanent contact between the different stacked piezoelectric elements. On the other, the prestress rods At, Tp form spring elements in which the return force acts in the piezoelectric pillar retraction direction and hence increases the retraction speed of said pillar.

In the first and second embodiments, when the actuator A is switched on, it lengthens in such a way that the flap C is moved to the closing position. The elongation of the actuator A also produces that of the prestress rods At, Tp such that said rods are subject to tensile stress and tensioned. When the actuator A is no longer powered, it retracts and returns to its original position. The prestress rods At, Tp also return to their original position and act as a return spring on the piezoelectric pillar in such a way that the movement of the flap C to the opening position is accelerated. Due to the configuration of the prestress rods At, Tp, the return force that they exert (corresponding to the tensile stress to which they are subjected) makes it possible to open the flap C more quickly, this force helping combat the pressure exerted on the active face Cf1 of said flap when it switches from the closing position to the opening position.

In the third and fourth embodiments, the return force exerted by the prestress rods At, Tp acts in the direction of movement of the flap C to the closing position, said movement thus being accelerated. The return force exerted by the prestress rods At, Tp therefore makes it possible to close the flap C more quickly, this force combining the pressure force exerted on the active face Cf1 of said flap during the closing phase.

The prestress rods At, Tp thus make it possible to reduce the opening/closing times of the valve even further, in particular when the pressure of the fluid is high. The applicant observed experimentally that compared with a non-prestressed piezoelectric pillar (for example with the same pillar, but where the piezoelectric elements are bonded together), the prestress rods At, Tp enabled a reduction of the opening time (for the first and second embodiments) and closing time (for the third and fourth embodiments) by 20% to 100 bar and by 30% to 300 bar.

The best results in terms of opening/closing speed are obtained when the total rigidity of the prestress rods At, Tp is between 10% and 20% of the rigidity of the piezoelectric pillar alone. In other words, the original (non-prestressed) piezoelectric pillar is 5 to 10 times more rigid than the prestress rods At, Tp. For example, the piezoelectric pillar alone has a rigidity of 96 MN/m (mega Newton per metre) and all the rods At, Tp, a rigidity of 16.5 MN/m (i.e. 5.5 MN/m per rod, if three prestress rods are used).

The best results in terms of opening/closing speed are furthermore obtained when the prestress force applied on the piezoelectric pillar is between 5% and 20% of the mechanical force delivered by the piezoelectric pillar alone. In other words, the force delivered by the original (non-prestressed) piezoelectric pillar is 5 to 20 times greater than the prestress force applied on the prestress rods At, Tp. For example, if the piezoelectric pillar delivers a mechanical force of 10 kN (Kilo Newton), the prestress force applied by all the rods At, Tp, is between 0.5 kN and 2 kN (i.e. between 0.15 and 0.7 kN per rod, if three prestress rods are used).

Use of the Valve According to the Invention

The valve V may be used as a simple valve, in conventional applications, in particular to block or allow the fluid flow in order to optionally supply one or more actuators or hydraulic components.

Another aspect of the invention relates to the use of the valve V in a process and system for generating electricity using a piezoelectric generator to produce an electrical energy. The expression "piezoelectric generator" refers to any piezoelectric materials or piezoelectric elements or combination of said materials/elements capable of being electrically polarised under the action of a mechanical stress and conversely of deforming when an electric field is applied thereto. In this instance, the piezoelectric material is firstly used to produce an electrical energy when it is subjected to a mechanical energy.

FIG. 10 illustrates an embodiment containing the elements of a system for generating electricity according to the invention, namely a circuit 10, more specifically a portion of the circuit, wherein a pressurised fluid (for example between 5 bar and 300 bar) and whereon or at which a fluidic cavity 3 housing a piezoelectric stack or pillar 4 forming the piezoelectric generator is arranged. This pillar 4 is connected to an electronic load extraction circuit 5. The cavity 3 is installed between two valves according to the invention, respectively an intake valve V1 and an exhaust valve V2, said valves being mounted in series.

The conduit 10 may for example consist of a bypass produced on a pressurised fluid pipe of a wind turbine, marine turbine, wave powered plant, etc. type installation.

In a first sequence, the intake valve V1 is controlled so that its flap is in the opening position and the exhaust valve V2 is controlled so that its flap is in the closing position. The pressurised fluid circulating in the circuit 10, enters and fills at least partially the fluidic cavity 3 so as to induce a mechanical pressure on the piezoelectric pillar 4. This pressure produces a deformation of the pillar 4 in such a way that it generates electric loads, also referred to as electrical energy, which are recovered by the electronic load extraction circuit 5.

Following this first operating sequence, a second operating sequence comprises the closing of the intake valve V1 and the opening of the exhaust valve V2. The fluid is discharged from the fluidic cavity 3 in such a way that the pillar 4 is no longer stressed and returns to its initial idle state (with no pressure exerted by the fluid). The opposite deformation leading the piezoelectric generator 4 to return to its initial state again enables the generation of electric load, which can furthermore be recovered by the electronic load recovery circuit 5. Thus, the system makes it possible to recover electric energy, on one hand, when the pressurised fluid enters the fluidic cavity 3 and, on the other, when said fluid is discharged from said cavity.

Thus, if the first sequence and the second sequence are compared, the intake V1 and exhaust valves V2 have respective reverse or opposite opening/closing positions. In other words, when one—for example the intake valve V1—is open, the other valve V2 is closed and the two sequences are advantageously intimately linked to each other within the scope of the present invention. The invention is characterised, in such a specific system, by the alternation of the first sequence and the second sequence mentioned hereinabove. Moreover, the frequency of occurrence of the first sequence and/or the second sequence, is modifiable or adaptable according to different parameters, of which in particular the resonance frequency of the piezoelectric generator 4, said resonance frequency being in turn modifiable by modifying the rigidity of said piezoelectric generator.

According to an embodiment making it possible to simplify the design, the valves V1 and V2 are identical. They are for example designed according to the first embodiment (FIGS. 4a and 4b) or according to the second embodiment (FIGS. 5a, 5b) or according to the third embodiment (FIGS. 6a, 6b) or according to the fourth embodiment (FIGS. 7a, 7b).

In an alternative, the valves V1 and V2 are different. They are in particular designed according to two different embodiments. Advantageously, the intake valve V1 is designed according to the first embodiment (FIGS. 4a and 4b) or according to the second embodiment (FIGS. 5a, 5b), and the exhaust valve V2 according to the third embodiment (FIGS. 6a, 6b) or according to the fourth embodiment (FIGS. 7a, 7b). The fluid passing through the valves V1 and V2 has a certain compressibility, even slight in the case of a liquid. It is therefore possible to observe a relative variation of its volume when it circulates under pressure between the two valves V1 and V2 and it enters the fluidic cavity 3. This volume variation induces a loss of power. It is therefore preferable that this volume variation be as small as possible to minimise the loss of power. However, the volume of the first chamber Vh may be different from that of the second chamber Ve. And in practice, the volume of the first chamber Vh is greater than that of the second chamber Ve. During the first operating sequence cited hereinabove (intake valve V1 open and exhaust valve V2 closed), it is advantageous that the fluid enter the chamber of the exhaust valve V2 which has the smallest volume, i.e. in the second chamber Ve. For this reason, the exhaust valve V2 is advantageously according to the third embodiment (FIGS. 6a, 6b) or according to the fourth embodiment (FIGS. 7a, 7b).

It should be noted that the fluidic cavity 3 has a variable volume due to the contraction of the piezoelectric generator 4 when the fluid enters said cavity and the expansion of said generator when said fluid is discharged from said cavity. The variation of the volume of the fluidic cavity 3 may be adjustable, in particular by setting the rigidity of the piezoelectric generator 4. This variation of the volume of the fluidic cavity 3 has a direct effect on the flow rate of the liquid circulating in the conduit 10 and hence on the torque of the pump 11.

According to an embodiment, the piezoelectric pillar 4 is composed of a stack of piezoelectric ceramics alternated with electrodes made of a conductive material, such as for example copper or bronze. For example, hard PZT ceramic washers are used. The electrodes are wired in parallel or in series. The number of ceramics and electrodes varies from 2 to 50, or even 150. These ceramics and electrodes have the same shape and have preferably a circular cross-section. They are axially perforated. For example, their external diameter is between 0.5 cm and 20 cm, and their thickness between 1 mm and 100 mm. The diameter of the axial hole is for example between 0.5 cm and 10 cm. The axial holes ensure an axial alignment of the ceramics and the electrodes. When the ceramics and electrodes are stacked, the axial holes delimit a central bore coaxial with the axis of the pillar 4. This central bore allows the passage of a rod which centres, aligns and helps hold the ceramics and the electrodes. Attachment means are disposed at the ends of the rod. These attachment means are presented for example in the form of rigid parts attached to the ends of the rod in such a way as to clamp the stack of ceramics and electrodes. The part is presented for example in the form of a nut screwed onto the threaded end of the rod. The part may also be a nut, or a tapped part, attached to a frame, and wherein the other threaded end of the rod is screwed. For safety reasons, the stack of ceramics and electrodes is advantageously electrically insulated. For this purpose, the rod may be placed in a sleeve or sheath made of an electrically insulating material such as a plastic. It may also be provided to house the stack in a sleeve or in an outer sheath also made of an electrically insulating material.

The electronic load extraction circuit 5 recovers the electrical energy—the electrons released—from the piezoelectric generator 4. According to an embodiment, it comprises: a controlled high-voltage switch, advantageously a thyristor; a voltage rectifier bridge; an induction coil in which the connection with the piezoelectric generator 4 forms an LC type resonant circuit, the capacitive element consisting of the pillar per se, a capacitance or a filtering capacitor placed in parallel; a storage system for storing this electrical energy before its conditioning for use on a network. This storage system consists for example of a supercapacitor battery or bank.

When the piezoelectric generator 4 is subjected to an alternating excitation (according to the sequences described hereinabove), and during the stress growth phase, the switch is kept open. The piezoelectric generator 4 is open-circuit and the electric loads are accumulated at the terminals of said pillar, the latter operating as a capacitor. When the mechanical stress applied to the piezoelectric generator 4 is maximum, the switch is closed briefly for a duration corresponding to a half-period of the resonance of the circuit LC. Thus, all the electric loads accumulated at the terminals of the piezoelectric generator 4 are extracted from said pillar by the circuit 5. During the stress decline phase, the piezoelectric generator 4 is charged. When the stress is minimal, the switch is once again closed briefly for a duration corresponding to a half-period of the resonance of the LC circuit, so as to extract the electric loads. Then the cycle resumes with the alternation of the first and second sequences.

The configuration of the electronic load extraction circuit 5 is adapted to maximise the electrical energy produced by the piezoelectric generator 4. This configuration indeed makes it possible to double the electrical energy generated by the piezoelectric generator 4 by recovering it a first time during the application of stress on said generator by the pressurised fluid (first sequence described hereinabove), and a second time when it is released (second sequence described hereinabove).

According to an embodiment, the opening/closing frequency of the valves V1 and V2, i.e. the frequency of the first or the second sequence, is controlled thanks to their respective control unit UC1, UC2, so that this opening/closing frequency, or of the first and second sequence, corresponds to the resonance frequency of the piezoelectric generator 4 so as to recover maximum electrical energy. Such an optimum operation wherein the load or electrical energy recovery is maximum is obviously possible with all the embodiments. According to an alternative embodiment, a single control unit UC1 or UC2 is used for controlling he opening/closing frequency of the valves V1 and V2.

The resonance frequency of the piezoelectric generator 4 is established between 10 Hz and 1000 Hz. The use of the ultra-fast valves V1, V2 according to the invention makes it possible to easily ensure excitation frequencies greater than 100 Hz and of up to 1000 Hz.

FIG. 11 illustrates an alternative embodiment where several fluidic cavities 3a, 3b are installed in the conduit 10, between the valves V1 and V2. This embodiment makes it possible to recover more electrical energy. Each fluidic cavity 3 houses a piezoelectric generator 4a, 4b. These generators 4a, 4b are here connected to a common electronic load extraction circuit 5, but it may be provided to connect each generator to its own electronic load extraction circuit.

The system for generating electricity described hereinabove is particularly simple, reliable and robust in its design and may be readily integrated in any type of installation comprising a pressurised fluid circuit given its ease of implementation. This system is furthermore relatively inexpensive, both in terms of assembly/installation and/or manufacture and in terms of the different elements composing such a system.

The arrangement of the different elements and/or of the means and/or steps of the invention, in the embodiments described hereinabove, should not be understood as requiring such an arrangement in all implementations. In any case, it should be understood that various modifications could be made to these elements and/or means and/or steps, without departing from the spirit and the scope of the invention. In particular:

- The plate P and/or the flap C may have a cross-section other than circular, for example a square, rectangular, polygonal, oval cross-section, etc.
- The first channels Rp may be presented in the form of annular groove segments, or only in the form of through holes, or in other forms such as non-annular and/or non-concentric grooves or groove segments.
- The annular grooves Rp may be through, i.e. produced in the entire thickness of the plate P and opening at each of the faces Pf1 and Pf2.
- The second channels Rc may be presented in the same form as the first channels Rp (grooves+holes), or only in the form of through holes, or in other forms such as non-annular and/or non-concentric grooves or groove segments.

The piezoelectric generator 4 may be presented in the form of a piezoelectric membrane, for example consisting of a material from the PVDF family, more particularly a PVDF derivative such as a PVDF/PDMS.

Furthermore, one or more features disclosed solely in one embodiment can be combined with one or more other features disclosed solely in another embodiment. Similarly, one or more features disclosed solely in one embodiment may be generalised to the other embodiments, even if this or these feature(s) are described merely in combination with other features.

The use of the verb "include", "comprise" or "contain" and of its conjugated forms does not exclude the presence of other elements or other steps than those set out in a claim.

The invention claimed is:

1. A valve comprising a pressurised fluid inlet and a fluid outlet, said valve including:
   - a fixed plate wherein first fluid flow channels are arranged,
   - a flap wherein second fluid flow channels are arranged, said flap movably mounted between:
     - an opening position wherein the first channels and the second channels are in a configuration allowing the flow of the fluid between the inlet and the outlet, and
     - a closing position wherein the first channels and the second channels are in a configuration blocking the flow of the fluid between the inlet and the outlet,
   - a piezoelectric actuator acting upon the flap to move it between the closing position and the opening position, said actuator comprising a piezoelectric pillar formed by a piezoelectric element stack structure, said pillar lengthening when the actuator is switched on and retracting when said actuator is not switched on,
   and wherein the inlet is arranged in such a way that, in use, the pressurised fluid exerts a pressure force on an active face of said flap stressing said flap to the closing position, wherein,
   the actuator is axially prestressed by means of one or more prestress rods forming spring elements in which the return force acts in the piezoelectric pillar retraction direction.

2. The valve according to claim 1, wherein the prestress force applied by the one or more prestress rods on the piezoelectric pillar is between 5% and 20% of the mechanical force delivered by said piezoelectric pillar alone.

3. The valve according to claim 1, wherein the one or more prestress rods have a rigidity between 10% and 20% of the rigidity of the piezoelectric pillar alone.

4. The valve according to claim 1, wherein:
   - in the opening position, the flap is spaced apart from the plate in such a way that the first channels and the second channels are in fluidic communication,
   - in the closing position, the flap in is contact with the plate in such a way that the first channels and the second channels are not in fluidic communication.

5. The valve according to claim 1, wherein:
   - the flap is movably mounted in a chamber between the opening position and the closing position,
   - the second channels are in fluidic communication with the chamber,
   - the inlet is disposed upstream from the flap, at the chamber, and
   - the outlet is disposed downstream from the plate, in fluidic communication with the first channels in such a way that, in use and in the opening position, the fluid flows from the second channels to said first channels.

6. The valve according to claim 1, wherein the piezoelectric actuator is configured in such a way that the flap is naturally in the opening position when said actuator is not switched on, the one or more prestress rods being configured in such a way that the return force exerted by said one or more prestress rods acts against the pressure force exerted, in use, on the active face of said flap when said flap switches from the closing position to the opening position.

7. The valve according to claim 6, wherein the flap is disposed between the actuator and the plate.

8. The valve according to claim 1, wherein the piezoelectric actuator is configured in such a way that the flap is naturally in the closing position when said actuator is not switched on, the one or more prestress rods are configured in such a way that the return force exerted by said one or more prestress rods is combined with the pressure force exerted, in use, on the active face of said flap when said flap switches from the opening position to the closing position.

9. The valve according to claim 8, wherein the plate is disposed between the actuator and the flap.

10. The valve according to claim 1, wherein:
    - the piezoelectric elements are mounted on a prestress rod installed along an axis of translation,
    - the rod is engaged with the flap in such a way that the translation of said rod induced by the piezoelectric actuator produces the translation of said flap between the opening and closing positions.

11. The valve according to claim 10, wherein the plate has a central orifice wherein the rod is housed, said orifice acting as a guide for said rod.

12. The valve according to claim 1, wherein:
    - the piezoelectric actuator has, at one of its ends, a connection part on which the flap is attached, and
    - the flap includes, at one face, a projecting element adapted to be attached to the connection part.

13. The valve according to claim 12, wherein:
    - the flap includes, at another face, another projecting element extending towards the plate, and
    - the plate has a central orifice wherein said other projecting element is housed, said orifice acting as a guide for said other projecting element.

14. A system for generating electricity including:
    - a circuit wherein a pressurised fluid circulates,
    - at least one fluidic cavity arranged on at least one portion of the circuit, said cavity housing a piezoelectric generator connected to an electronic load extraction circuit capable of recovering the electrical energy from said piezoelectric generator,
    and wherein:
    - the fluidic cavity is installed between two valves according to claim 1, respectively an intake valve and an exhaust valve,
    - in a first operating sequence, the intake valve is controlled so that its flap is in the opening position and the exhaust valve is controlled so that its flap is in the closing position, in such a way that the pressurised fluid enters and fills at least partially the fluidic cavity so as to induce a mechanical pressure on the piezoelectric generator, said pressure producing a deformation of said generator generating an electrical energy recovered by the electronic load extraction circuit,
    - in a second operating sequence, the intake valve is controlled so that its flap is in the closing position and the exhaust valve is controlled so that its flap is in the opening position, in such a way that the pressurised fluid is discharged from the fluidic cavity and the piezoelectric generator is no longer stressed.

15. The system according to claim 14, wherein the opening/closing frequency of the intake and exhaust valves is controlled in such a way that it corresponds to the resonance frequency of the piezoelectric generator.

16. The system according to claim 1, wherein the intake valve is a flap is disposed between the actuator and the plate and the exhaust valve is a plate is disposed between the actuator and the flap.

17. A Method for accelerating the opening/closing of a valve, said valve comprising a pressurised fluid inlet and a fluid outlet, and including:
- a fixed plate wherein first fluid flow channels are arranged,
- a flap wherein second fluid flow channels are arranged, said flap being movably mounted between:
  - an opening position wherein the first channels and the second channels are in a configuration allowing the flow of the fluid between the inlet and the outlet, and
  - a closing position wherein the first channels and the second channels are in a configuration blocking the flow of the fluid between the inlet and the outlet,
- a piezoelectric actuator acting upon the flap to move it between the closing position and the opening position, said actuator consisting of a piezoelectric pillar formed by a piezoelectric element stack structure, said pillar lengthening when the actuator is switched on and retracting when said actuator is not switched on, wherein the method comprises the steps of:
- arranging the inlet in such a way that, in use, the pressurised fluid exerts a pressure force on an active face of the flap stressing said flap to the closing position, and
- axially prestressing the actuator by means of one or more prestress rods forming spring elements in which the return force acts in the piezoelectric pillar retraction direction.

* * * * *